United States Patent
Brotzki et al.

(10) Patent No.: US 10,213,756 B2
(45) Date of Patent: *Feb. 26, 2019

(54) MAGNETIC DISC COUPLER

(71) Applicant: WHIRLPOOL CORPORATION, Benton Harbor, MI (US)

(72) Inventors: Bernard J. Brotzki, Benton Harbor, MI (US); Michael P. Conti, St. Joseph, MI (US); Steven C. Drees, Stevensville, MI (US); Edward Haney, Baroda, MI (US); Paul S. Paget, Kalamazoo, MI (US); Mitchell L. Robertson, Elkhart, IN (US); Timothy Patrick Vanantwerp, Stevensville, MI (US); Jeremy T. Wolters, Stevensville, MI (US)

(73) Assignee: Whirlpool Corporation, Benton Harbor ( * ) Notice: Subject to any disclaimer, the term of this patent is extended or adjusted under 35 U.S.C. 154(b) by 0 days.

This patent is subject to a terminal disclaimer.

(21) Appl. No.: 15/730,221

(22) Filed: Oct. 11, 2017

(65) Prior Publication Data
US 2018/0028991 A1   Feb. 1, 2018

Related U.S. Application Data

(63) Continuation of application No. 14/508,115, filed on Oct. 7, 2014, now Pat. No. 9,815,037.

(Continued)

(51) Int. Cl.
*A47J 43/046* (2006.01)
*B01F 15/00* (2006.01)
(Continued)

(52) U.S. Cl.
CPC ....... *B01F 15/0048* (2013.01); *A47J 43/0465* (2013.01); *A47J 43/0766* (2013.01);
(Continued)

(58) Field of Classification Search
CPC .................................................. A47J 43/0465
(Continued)

(56) References Cited

U.S. PATENT DOCUMENTS

| 1,242,493 A | * | 10/1917 | Stringham | .......... B01F 13/0827 310/211 |
| 1,420,774 A | * | 6/1922 | Stainbrook | .......... A47J 43/0465 241/46.017 |

(Continued)

FOREIGN PATENT DOCUMENTS

| DE | 102009058258 A1 | 6/2011 |
| DE | 102011052745 A1 | 2/2013 |

(Continued)

*Primary Examiner* — David L Sorkin
(74) *Attorney, Agent, or Firm* — Price Heneveld LLP

(57) ABSTRACT

A blending appliance includes a housing with a jar receiving area defined between an upper housing and a support base. A blender jar includes a base portion and a receptacle portion, and is configured to be laterally received within the jar receiving area of the housing. A magnetic coupling system includes an upper magnetic coupler disposed in the base portion of the blender jar and a lower magnetic coupler disposed in the support base of the housing. The upper and lower magnetic couplers are magnetically coupled to one another for driving a blade assembly disposed in the receptacle portion of the blender jar. A brake mechanism is disposed on the upper magnetic coupler and is configured to stop rotation of the upper magnetic coupler when the blender jar is removed from the jar receiving area.

19 Claims, 34 Drawing Sheets

Related U.S. Application Data

(60) Provisional application No. 61/895,648, filed on Oct. 25, 2013.

(51) Int. Cl.
  *A47J 43/07* (2006.01)
  *H02K 7/102* (2006.01)
  *H02K 49/10* (2006.01)

(52) U.S. Cl.
  CPC ..... *B01F 15/00538* (2013.01); *H02K 7/1021* (2013.01); *H02K 49/104* (2013.01); *B01F 2015/00649* (2013.01)

(58) Field of Classification Search
  USPC .................................. 366/205, 273, 274, 314
  See application file for complete search history.

(56) References Cited

U.S. PATENT DOCUMENTS

| | | | |
|---|---|---|---|
| 2,313,175 A | | 3/1943 | Scott et al. |
| 2,549,121 A | | 4/1951 | Osterheld |
| 2,666,354 A | | 10/1953 | Murray |
| 2,702,571 A | | 2/1955 | Murray |
| 3,140,079 A | | 7/1964 | Baermann |
| 3,168,294 A | | 2/1965 | Hasumura |
| 3,784,118 A | | 1/1974 | Hurwitz |
| 3,887,169 A | | 6/1975 | Maynard |
| 3,951,351 A | | 4/1976 | Ernster et al. |
| 4,071,789 A | | 1/1978 | Ernster et al. |
| 4,078,246 A | | 3/1978 | Berthoux et al. |
| 4,111,372 A | | 9/1978 | Hicks et al. |
| 4,174,073 A | | 11/1979 | Maher et al. |
| 4,227,815 A | * | 10/1980 | Hoffa .................. B01F 13/0818 356/246 |
| 4,285,473 A | | 8/1981 | Williams |
| 4,286,885 A | | 9/1981 | Uibel et al. |
| 4,371,048 A | | 2/1983 | Hansen |
| 4,381,048 A | | 4/1983 | Haverkamp et al. |
| 4,422,343 A | | 12/1983 | Falkenbach et al. |
| 4,501,538 A | | 2/1985 | Bray et al. |
| 4,521,819 A | | 6/1985 | Elsing et al. |
| 4,600,155 A | | 7/1986 | Musseau et al. |
| 4,613,086 A | | 9/1986 | Granum et al. |
| 4,620,479 A | | 11/1986 | Diamond et al. |
| 4,629,131 A | | 12/1986 | Podell |
| 4,647,727 A | | 3/1987 | Sontheimer |
| 4,653,519 A | | 3/1987 | Kanner |
| 4,706,896 A | | 11/1987 | Moon-Kau |
| 4,734,604 A | | 3/1988 | Sontheimer et al. |
| 4,822,172 A | | 4/1989 | Stottmann |
| 4,824,029 A | | 4/1989 | Stottmann et al. |
| 5,323,691 A | | 6/1994 | Reese et al. |
| 5,325,643 A | | 7/1994 | Mitchell et al. |
| 5,353,697 A | | 10/1994 | Venturati et al. |
| 5,395,060 A | | 3/1995 | Hackel et al. |
| 5,407,272 A | | 4/1995 | Meier |
| 5,486,050 A | | 1/1996 | Lenting |
| 5,524,530 A | | 6/1996 | Nijzingh et al. |
| 5,556,198 A | | 9/1996 | Dickson, Jr. et al. |
| 5,758,965 A | | 6/1998 | Gambrill et al. |
| 5,779,359 A | | 7/1998 | Gambrill et al. |
| 5,809,872 A | | 9/1998 | Sundquist |
| 6,095,677 A | | 8/2000 | Karkos, Jr. et al. |
| 6,189,441 B1 | | 2/2001 | Beaudet et al. |
| 6,210,033 B1 | | 4/2001 | Karkos, Jr. et al. |
| 6,318,247 B1 | | 11/2001 | Di Nunzio et al. |
| 6,325,312 B1 | | 12/2001 | Karkos, Jr. |
| 6,336,603 B1 | | 1/2002 | Karkos, Jr. et al. |
| 6,364,522 B2 | | 4/2002 | Kolar et al. |
| 6,402,365 B1 | | 6/2002 | Wong |
| 6,513,966 B1 | | 2/2003 | Gort-Barten et al. |
| 6,588,930 B2 | | 7/2003 | Wilson |
| 6,632,013 B2 | | 10/2003 | Wulf et al. |
| 6,634,580 B2 | | 10/2003 | Obersteiner |
| 6,641,298 B2 | | 11/2003 | Safont et al. |
| 6,748,853 B1 | | 9/2004 | Brady et al. |
| 6,793,167 B2 | | 9/2004 | Karkos, Jr. et al. |
| 6,889,924 B2 | | 5/2005 | Pavlovic et al. |
| 7,318,375 B2 | | 1/2008 | Huang |
| 7,354,192 B2 | | 4/2008 | Jejcic |
| 7,387,430 B2 | | 6/2008 | Short et al. |
| 7,448,789 B2 | | 11/2008 | Boquet et al. |
| 7,632,007 B2 | | 12/2009 | Wulf et al. |
| 7,708,215 B2 | | 5/2010 | Wang |
| 7,942,094 B2 | | 5/2011 | Kounlavong et al. |
| 7,993,054 B2 | | 8/2011 | Wulf et al. |
| 8,042,990 B2 | | 10/2011 | Pryor, Jr. et al. |
| 8,056,848 B1 | | 11/2011 | Llang |
| 8,087,818 B2 | | 1/2012 | Drees |
| 8,109,668 B2 | | 2/2012 | Garman et al. |
| 8,282,268 B2 | | 10/2012 | Karkos, Jr. et al. |
| 8,282,269 B2 | | 10/2012 | Terentiev |
| 9,815,037 B2 | * | 11/2017 | Brotzki .............. B01F 15/0048 |
| 2001/0002892 A1 | | 6/2001 | Karkos, Jr. et al. |
| 2002/0079393 A1 | | 6/2002 | Karkos, Jr. et al. |
| 2005/0002274 A1 | * | 1/2005 | Terentiev .............. B01F 1/0011 366/273 |
| 2005/0023193 A1 | | 2/2005 | Kim |
| 2006/0092761 A1 | | 5/2006 | Terentiev |
| 2006/0158958 A1 | | 7/2006 | Romanik |
| 2006/0227654 A1 | | 10/2006 | Blackburn et al. |
| 2007/0140048 A1 | | 6/2007 | Ismail |
| 2007/0286015 A1 | | 12/2007 | Markle |
| 2008/0008028 A1 | | 1/2008 | Terentiev et al. |
| 2008/0221739 A1 | | 9/2008 | Pryor et al. |
| 2008/0255636 A1 | | 10/2008 | Delmain et al. |
| 2009/0308265 A1 | | 12/2009 | Obersteiner |
| 2010/0013504 A1 | | 1/2010 | Wedlake |
| 2010/0139504 A1 | | 6/2010 | Wu Chang |
| 2010/0214867 A1 | * | 8/2010 | Karkos, Jr. ........... A47J 43/085 366/272 |
| 2011/0046786 A1 | | 2/2011 | Wulf et al. |
| 2011/0063941 A1 | | 3/2011 | Seidler et al. |
| 2011/0079596 A1 | | 4/2011 | Krasznai et al. |
| 2011/0203462 A1 | | 8/2011 | Boussemart et al. |
| 2011/0293807 A1 | | 12/2011 | Dushine et al. |
| 2012/0002501 A1 | | 1/2012 | Ulstad et al. |
| 2012/0027331 A1 | | 2/2012 | Llang |
| 2012/0085851 A1 | | 4/2012 | Allen |
| 2012/0192727 A1 | | 8/2012 | Wu |
| 2012/0294111 A1 | | 11/2012 | Rosengren et al. |
| 2013/0001220 A1 | | 1/2013 | Vidal et al. |
| 2013/0028044 A1 | | 1/2013 | Karkos, Jr. et al. |
| 2013/0134245 A1 | | 5/2013 | Gushwa |
| 2013/0220764 A1 | | 8/2013 | Choi et al. |
| 2015/0117137 A1 | | 4/2015 | Haney et al. |
| 2015/0117139 A1 | | 4/2015 | Conti et al. |

FOREIGN PATENT DOCUMENTS

| | | |
|---|---|---|
| EP | 1139837 B1 | 10/2001 |
| EP | 1562461 B1 | 8/2005 |
| EP | 2005867 A1 | 12/2008 |
| EP | 2186456 A1 | 5/2010 |
| EP | 2275013 A1 | 1/2011 |
| EP | 2545830 A1 | 1/2013 |
| EP | 2548636 A1 | 1/2013 |
| EP | 2583749 A1 | 4/2013 |
| WO | 2000041607 A1 | 7/2000 |
| WO | 20060104651 A2 | 10/2006 |
| WO | 2008062345 A1 | 5/2008 |

\* cited by examiner

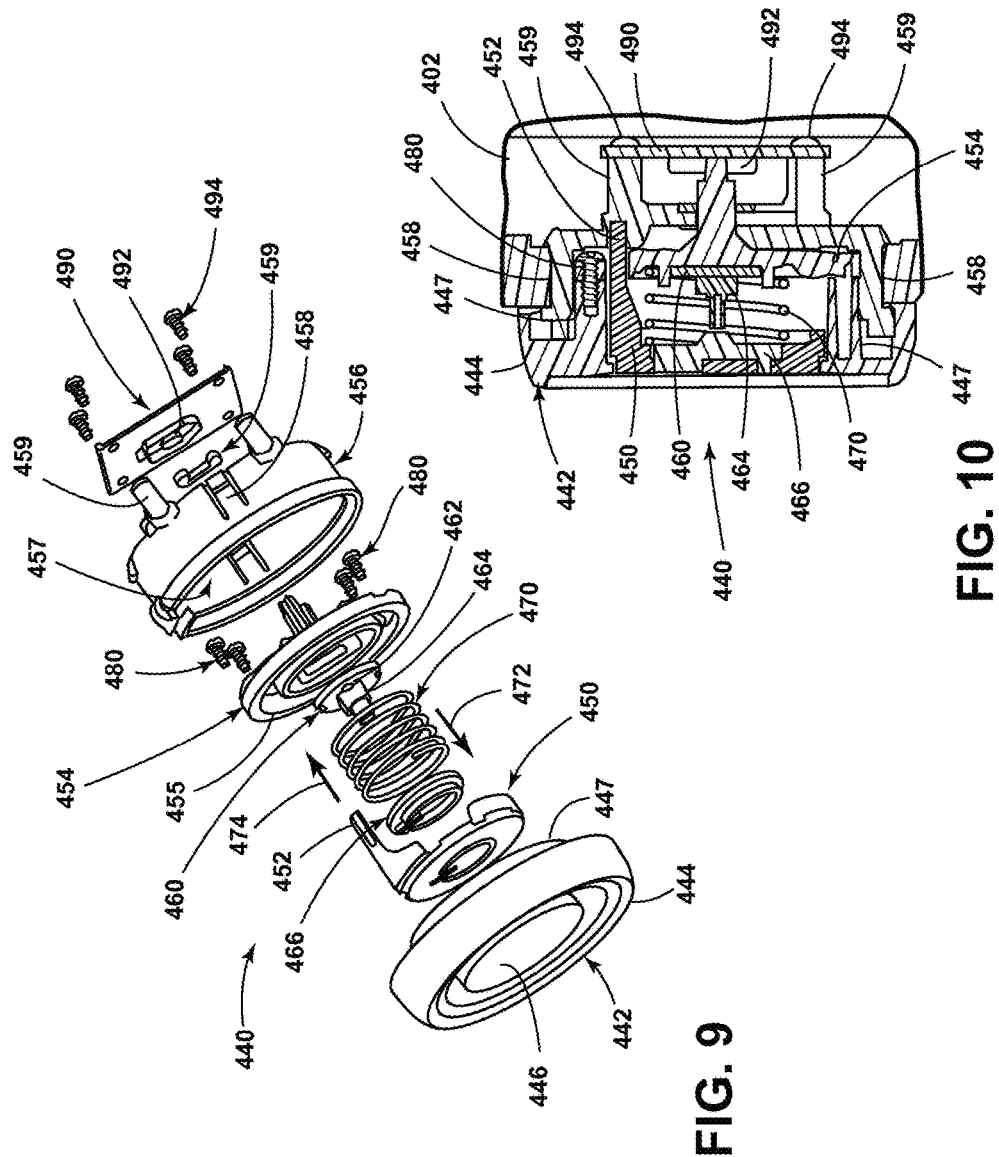

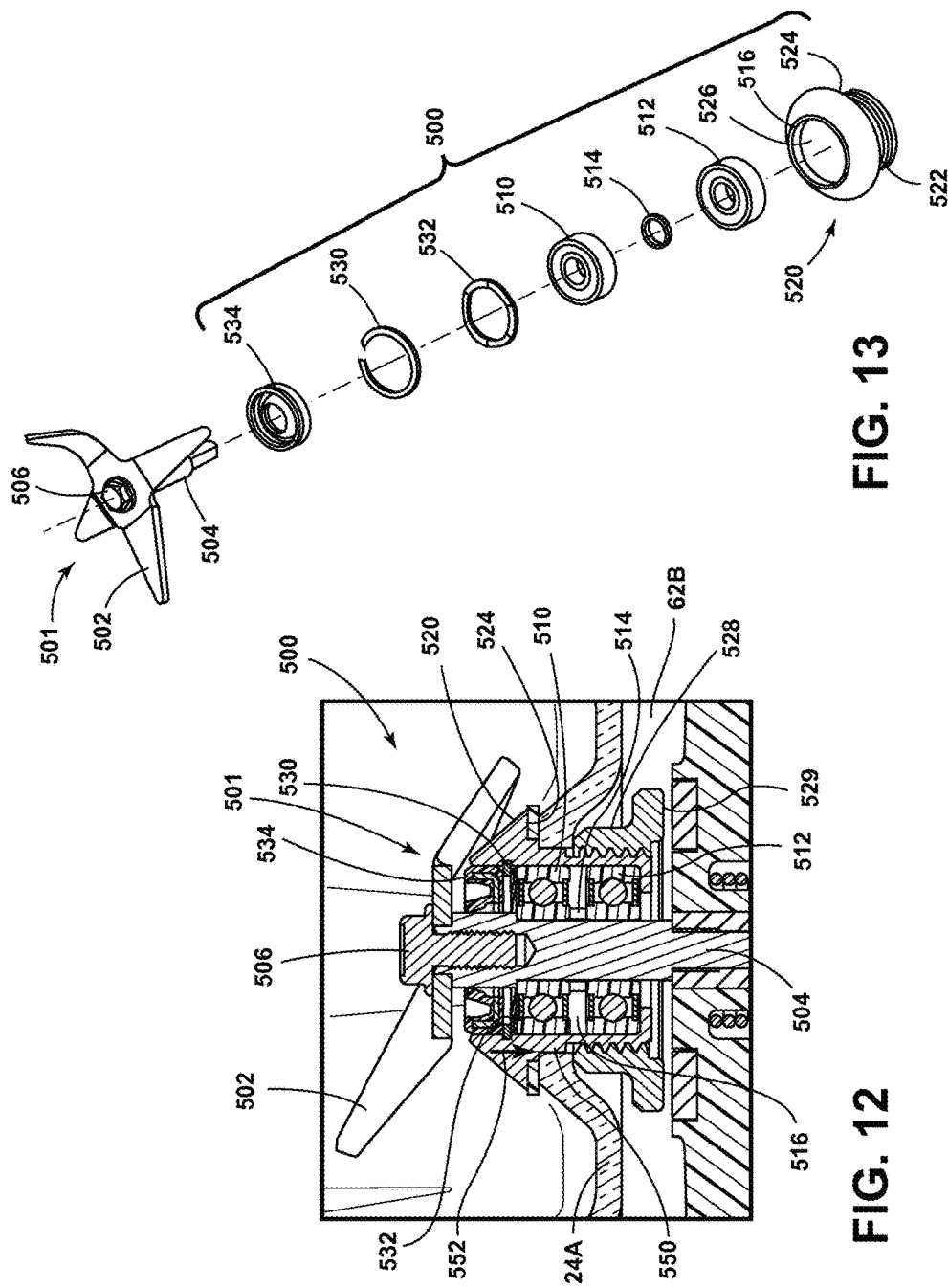

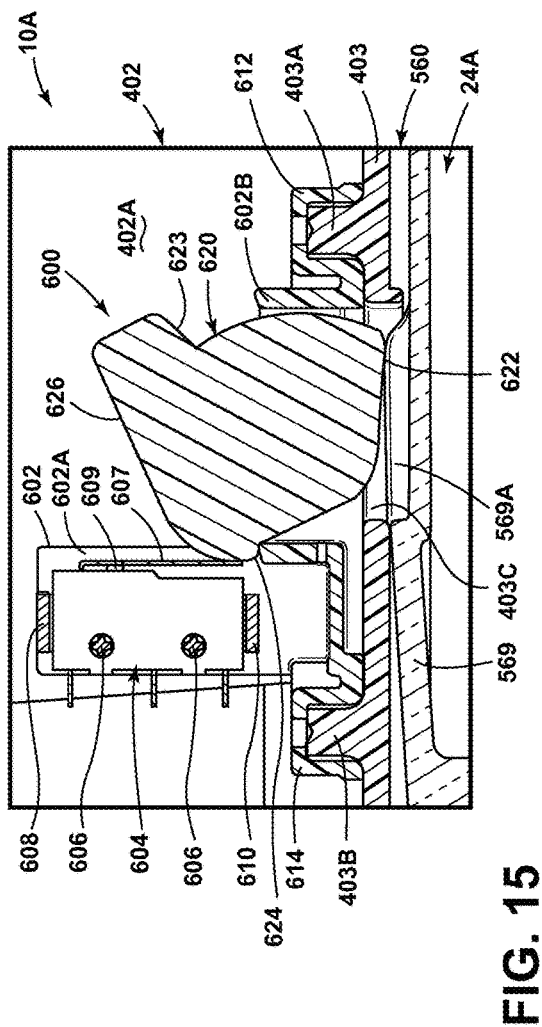
FIG. 15
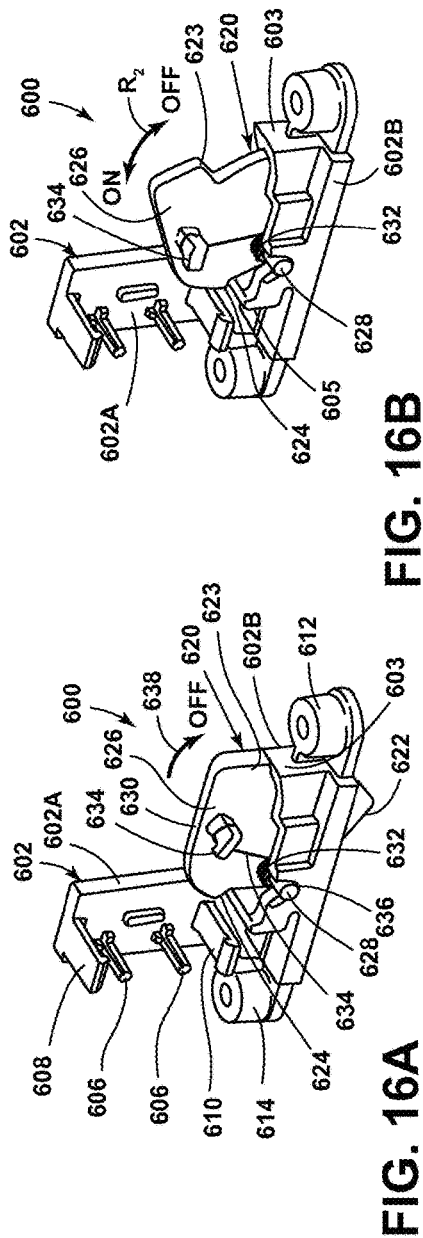
FIG. 16A
FIG. 16B

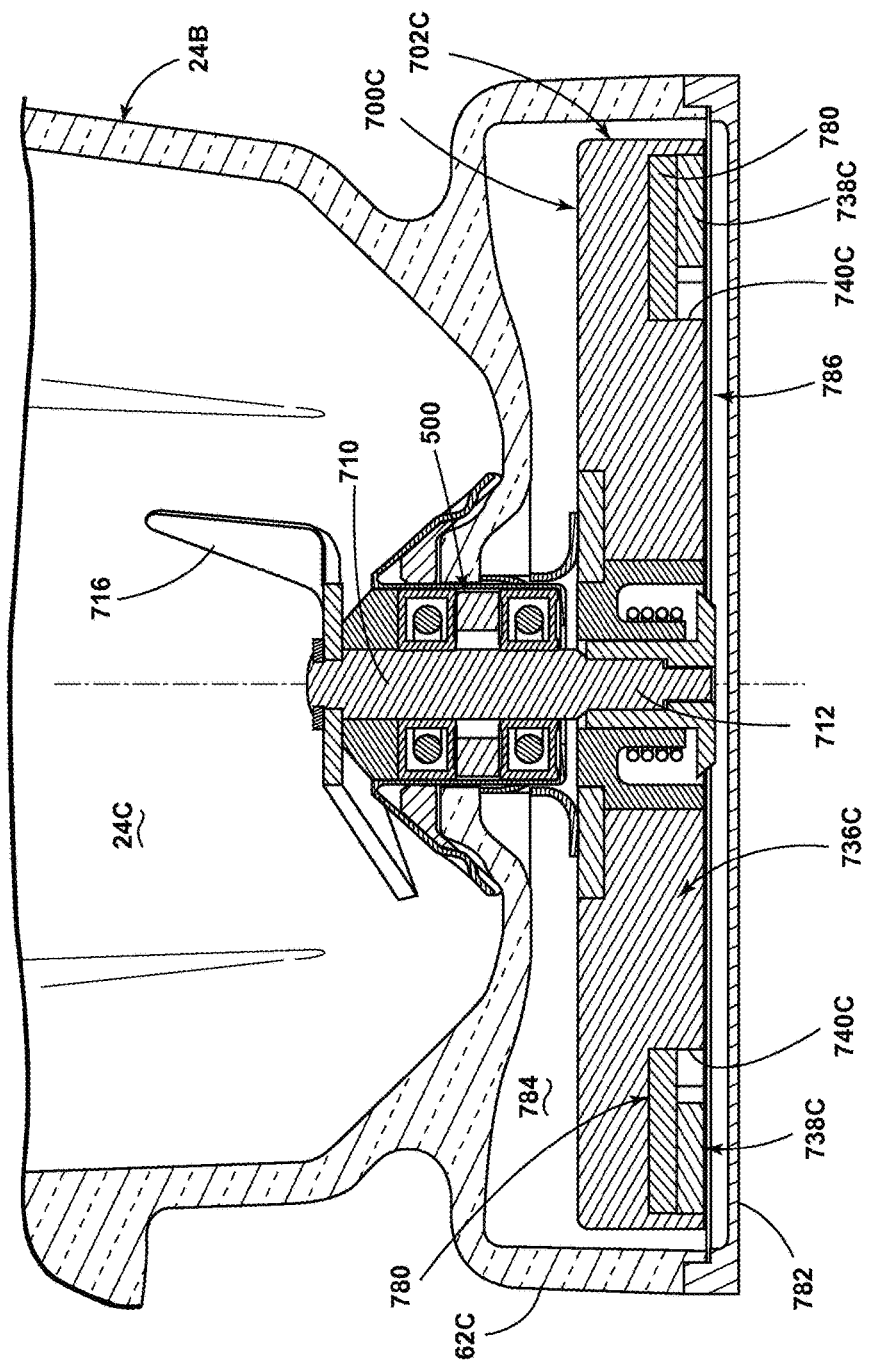

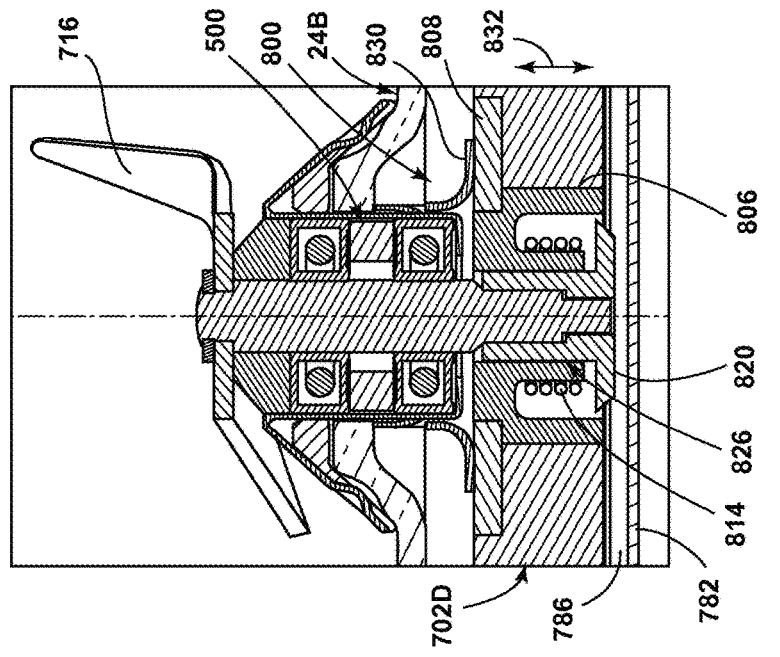
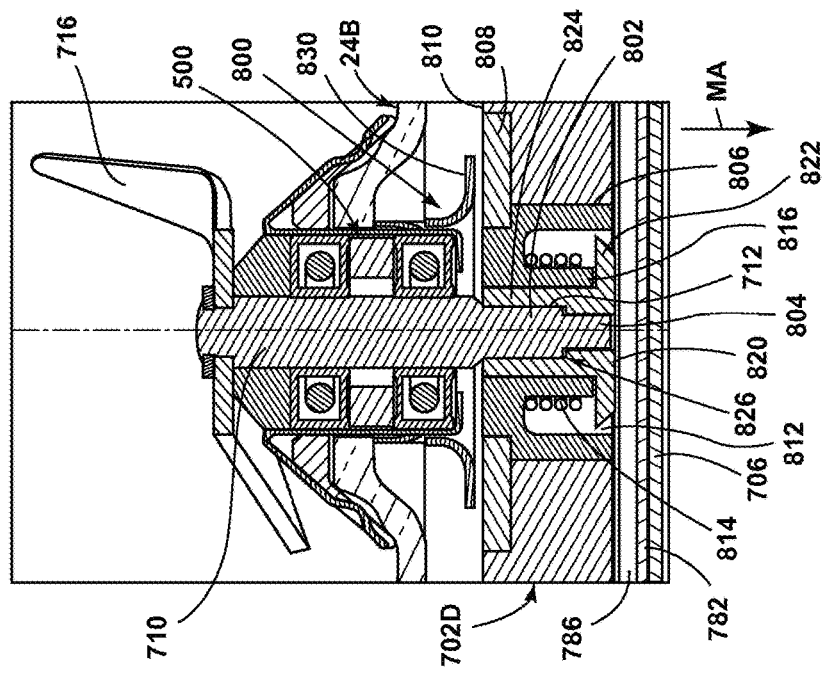
FIG. 25B
FIG. 25A

MAGNETIC DISC COUPLER

CROSS-REFERENCE TO RELATED APPLICATIONS

This application is a continuation of U.S. patent application Ser. No. 14/508,115 (now U.S. Pat. No. 9,815,037), filed Oct. 7, 2014, entitled "MAGNETIC DISC COUPLER," which claims priority to and the benefit under 35 U.S.C. § 119(e) of U.S. Provisional Patent Application No. 61/895,648, filed Oct. 25, 2013, entitled "MAGNETIC DISK COUPLER WITH MILD STEEL BACKING PLATE," which is hereby incorporated herein by reference in its entirety.

BACKGROUND

The present concept generally relates to a blending appliance, and more particularly to a blending appliance, wherein a blade assembly disposed within a blending jar is magnetically coupled to a drive system.

SUMMARY

One aspect of the present concept includes a blending appliance having a housing including a motor compartment and a jar receiving portion spaced laterally therefrom. The jar receiving portion includes an upper retaining member. A motor is disposed in the motor compartment. A support pad is operably coupled to the housing. A jar includes a lid with a feed chute. The jar and lid are configured for reception in the jar receiving portion. The lid is vertically secured onto the jar by the upper retaining member upon reception of the jar into the jar receiving portion. A blade assembly is disposed within the jar and is magnetically coupled to a drive system disposed within a base portion of the housing. A brake mechanism is coupled to the magnetic coupling assembly to stop the rotation of the blade assembly when the jar is laterally removed from the housing base.

Another aspect of the present concept includes a blending appliance having a housing with a motor compartment and a jar receiving portion spaced laterally therefrom. The housing includes a laterally extending upper housing portion. A motor is disposed in the motor compartment is adapted to drive a blade assembly of the jar through a magnetic coupling system. A jar includes a lid, and the jar and lid are adapted to be laterally received within the jar receiving portion, wherein the lid is vertically secured onto the jar by a lower portion of the upper housing upon reception of the jar into the jar receiving portion.

Another aspect of the present concept includes a blending appliance having a housing which includes a jar receiving area defined between an upper housing and a support base which both laterally extend from a motor compartment. A blender jar includes a base portion and a receptacle portion, and is configured to be laterally received within the jar receiving area of the housing. A magnetic coupling system includes an upper magnetic coupler disposed in the base portion of the blender jar and a lower magnetic coupler disposed in the support base of the housing. The upper and lower magnetic couplers are magnetically coupled to one another using one or more permanent magnets defining upper and lower magnetic arrays respectively. The lower magnetic coupler is also configured to rotate the upper magnetic coupler within the base portion of the blender jar as powered by a motor. A blade assembly is disposed in the receptacle portion of the blender jar, and is also operably coupled to a drive shaft which is further coupled to the upper magnetic coupler. A brake mechanism is disposed on the upper magnetic coupler and is configured to stop rotation of the upper magnetic coupler when the blender jar is removed from the jar receiving area.

Another aspect of the present concept includes a blending appliance having a housing which includes a jar receiving area defined between an upper housing and a support base. A blender jar includes a base portion and a receptacle portion, and is removeably received within the jar receiving area of the housing. An upper magnetic coupler is disposed in the base portion of the blender jar for rotation therein. The upper magnetic coupler is vertically movable between engaged and disengaged positions along a drive shaft. A bearing assembly is disposed about the drive shaft. In assembly, the drive shaft couples the upper magnetic coupler to a blade assembly disposed in the receptacle portion of the blender jar. The bearing assembly further includes a first brake surface. A second brake surface is disposed on the upper magnetic coupler and is configured to contact the first brake surface when the blender jar is removed from the jar receiving area and the upper magnetic coupler is in the engaged position. A lower magnetic coupler is disposed in the support base of the housing for rotation therein. The upper magnetic coupler is magnetically coupled to the lower magnetic coupler for rotation therewith when the upper magnetic coupler is in the disengaged position.

Yet another aspect of the present concept includes a magnetic coupling system for a blending appliance wherein an upper magnetic coupler and a lower magnetic coupler are magnetically coupled using one or more permanent magnets defining upper and lower magnetic arrays. The lower magnetic coupler is configured to rotate the upper magnetic coupler using magnetic torque. A blade assembly is coupled to a drive shaft which is further coupled to the upper magnetic coupler for rotation therewith. A brake mechanism is configured to stop rotation of the upper magnetic coupler when the upper magnetic coupler is in an engaged or braking position.

Yet aspect of the present concept includes a blending appliance having a housing which includes a motor compartment and a jar receiving portion spaced laterally or vertically therefrom. The motor is disposed in the motor compartment and is adapted to drive the blade assembly of the jar through a magnetic coupling system. A magnetic coupling system may include an upper non-magnetic, electrically conductive coupler disposed in the base of the jar and a lower magnetic coupler disposed in a support base of the housing. The upper and lower couplers are magnetically coupled to one another using one or more permanent magnets defining the lower coupler and a copper, copper alloy or other electrically conductive metal defining the upper coupler. The rotating magnetic field of the lower coupler generates inductive eddy currents in the upper coupler thus coupling the upper and lower coupler with magnetic inductance to drive a blending cutter configured within the jar.

These and other aspects, objects, and features of the present concept will be understood and appreciated by those skilled in the art upon studying the following specification, claims, and drawings.

BRIEF DESCRIPTION OF THE DRAWINGS

In the drawings:

FIG. 9 is an top perspective exploded view of a user-interface;

FIG. 10 is an assembled cross-sectional view of the user-interface of FIG. 9 coupled to an upper housing;

FIG. 12 is a cross-sectional view of a bearing assembly and blade assembly;

FIG. 13 is a top perspective exploded view of the bearing assembly of FIG. 12;

FIG. 15 is a cross-sectional view of an upper portion of a blender jar, cap and interlock switch assembly;

FIG. 16A is a top perspective view of the interlock switch assembly of FIG. 15 in an "OFF" position;

FIG. 16B is a top perspective view of the interlock switch assembly of FIG. 15 in an "ON" position;

FIG. 22A is a cross-sectional view of a blender jar and blender jar base portion having a magnetic coupler disposed therein;

FIG. 25A is a cross-sectional view of a blender jar and blender jar base portion having a magnetic coupler and a braking system in a disengaged position;

FIG. 25B is a cross-sectional view of the braking system of FIG. 25A in an engaged position;

DETAILED DESCRIPTION

Figure 1:
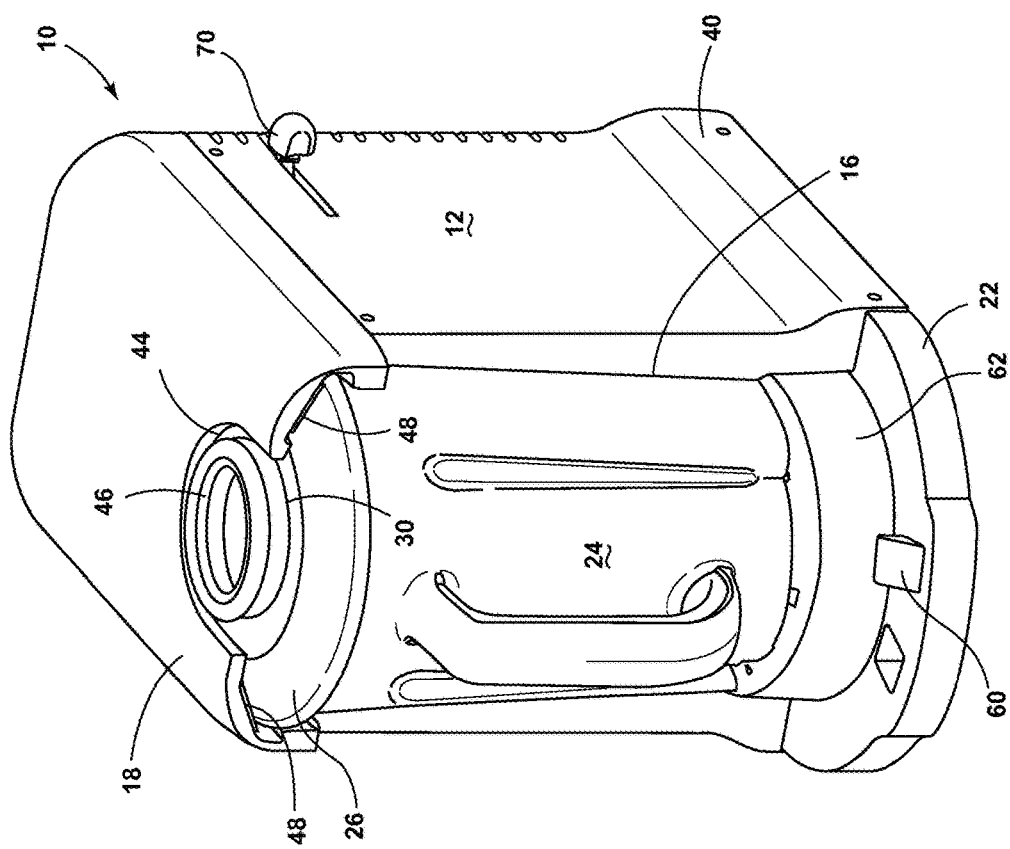
FIG. 1 is a top perspective view of one embodiment of a low profile side drive blending appliance of the present concept.

For purposes of description herein, the terms "upper," "lower," "right," "left," "rear," "front," "vertical," "horizontal," and derivatives thereof shall relate to the concept as oriented in FIG. 1. However, it is to be understood that the concept may assume various alternative orientations, except where expressly specified to the contrary. It is also to be understood that the specific devices and processes illustrated in the attached drawings, and described in the following specification are simply exemplary embodiments of the concepts defined in the appended claims. Hence, specific dimensions and other physical characteristics relating to the embodiments disclosed herein are not to be considered as limiting, unless the claims expressly state otherwise.

Figure 2:
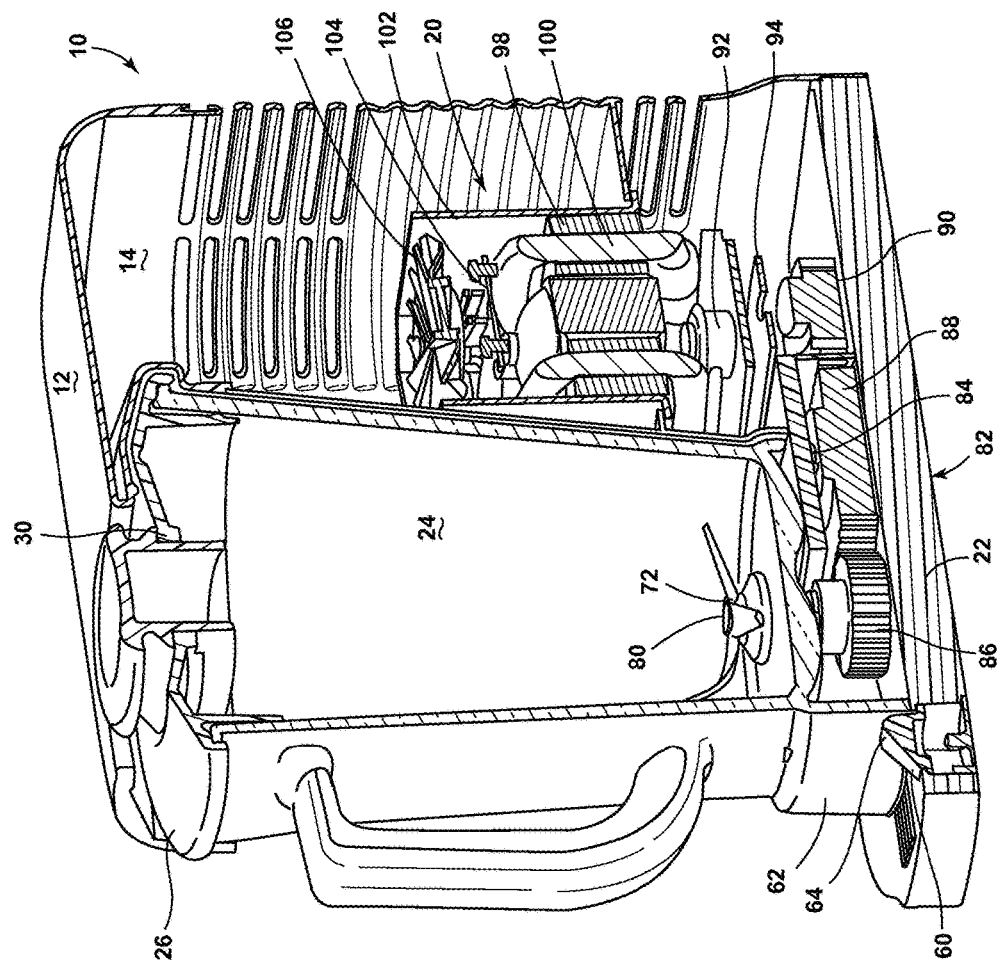
FIG. 2 is a top perspective cross-sectional view of the low profile side drive blending appliance of FIG. 1.
Figure 3:
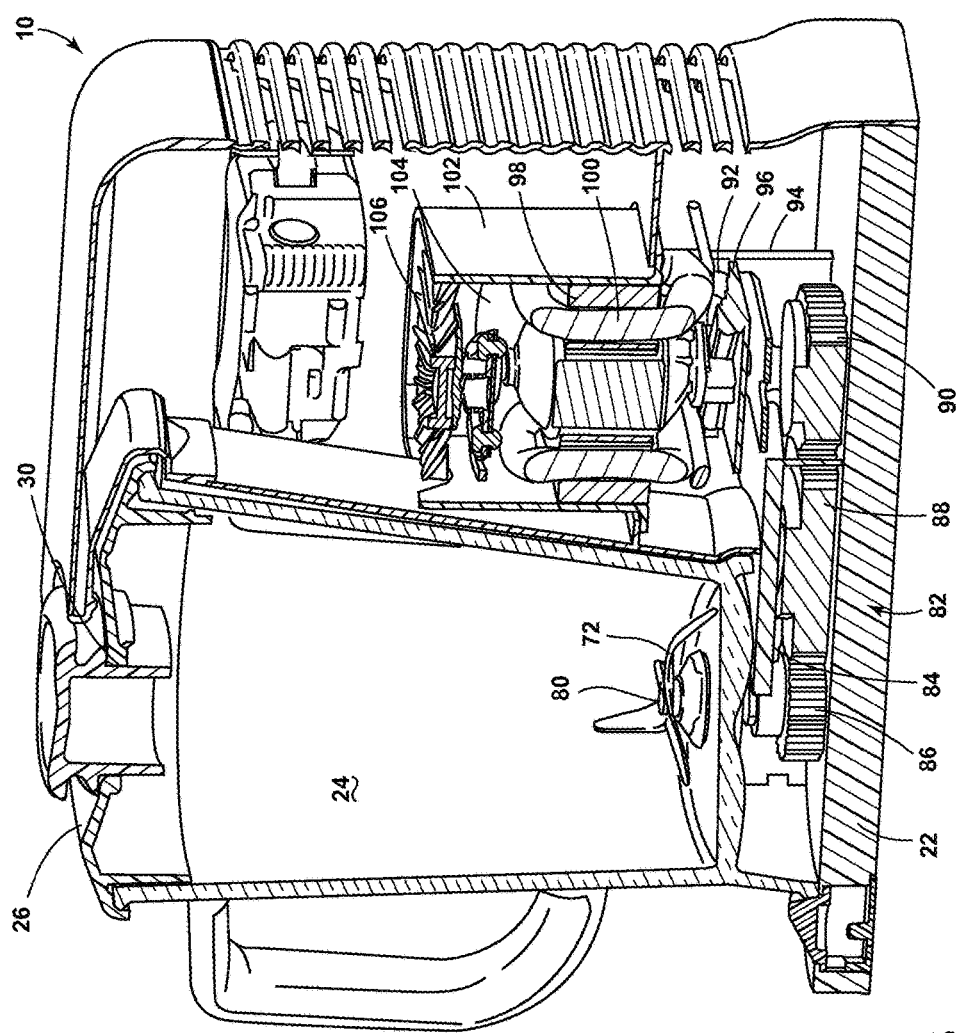
FIG. 3 is a rear perspective cross-sectional view of the low profile side drive blending appliance of FIG. 1.

Referring to FIGS. 1-3, reference numeral 10 generally designates a blending appliance having a housing 12 including a motor compartment 14 and a jar receiving portion 16 spaced laterally therefrom and which defines a cavity. The jar receiving portion 16 includes an upper retaining member 18. A motor 20 is disposed in the motor compartment 14. A support pad 22 is operably coupled to the housing 12. A jar 24 includes a lid 26 with a feed chute 30. The jar 24 and lid 26 are configured for reception in the jar receiving portion 16. The lid 26 is vertically secured onto the jar 24 by the upper retaining member 18 upon reception of the jar 24 into the jar receiving portion 16.

Referring again to FIGS. 1-3, the illustrated blending appliance 10 is generally configured to include a low profile to easily accommodate use under a cupboard or shelf in a kitchen area. The jar 24 of the blending appliance 10 is designed to engage the housing 12 from a lateral direction. Most traditional blending appliances include a construction that mandates vertical or drop-in placement of a jar onto a base that includes a motor therein. Unfortunately, these constructions require substantial vertical space above the base, and when connected with the jar 24, provide for a very tall appliance.

As shown in the illustrated embodiment of FIG. 1, the housing 12 includes a slightly widened housing base 40 and support pad 22 disposed below the upper retaining member 18. The upper retaining member 18 is designed to maintain the lid 26 of the jar 24 on the jar 24 during mixing of food goods inside the jar 24. In the illustrated embodiment, the upper retaining member 18 includes an arcuate recess 44 configured to receive at least a portion of the feed chute 30 that extends through the lid 26. The feed chute 30 includes a removable cap 46. The removable cap 46 can be removed from the lid 26 to install food goods into the jar 24 when the jar 24 is in connection with the housing 12. A tapered internal wall 48 is disposed on either side of the arcuate recess 44. The tapered internal wall 48 of the housing 12 allows for easy and quick insertion of the jar 24 and lid 26 into the housing 12, and at the same time, prevents the lid 26 from disengaging with the top of the jar 24 when the blending appliance 10 is activated. The support pad 22 extends from a forward portion of the housing 12 and generally defines a base that supports the jar 24 when the jar 24 is engaged in the blending appliance 10. The base may include a heating element disposed therein adapted to warm or heat food goods located inside the blending appliance 10.

In addition, the support pad 22 includes a jar lock 60. The lower jar lock 60 is designed to engage a jar base 62, such that a bottom of the jar 24 does not move away from the housing during activation of the blending appliance 10. It is contemplated that the jar lock 60 may be spring-biased to a raised position, such that during insertion of the jar 24 into the housing 12, the jar lock 60 springs upward to securely engage the jar 24 in the housing 12. To remove the jar 24, a user would simply push down on the spring-biased jar lock 60 until a top edge 64 of the jar lock 60 is positioned below a bottom surface of the jar 24. After the jar lock 60 has been moved to this lowered position, the jar 24 can safely be removed laterally from the housing 12.

Referring again to FIG. 1, a slider switch 70 is disposed on a side of the housing 12. The slider switch 70 has the effect of controlling the speed of the motor 20 disposed inside the motor compartment 14 of the housing 12. The slider switch 70, and therefore, the speed control, is generally linear in the illustrated embodiment. However, it is also contemplated that knobs or other electrical or mechanical user interface assemblies may be utilized to control the rate or speed of the motor 20, such as the dial configuration described below with reference to FIGS. 9 and 10. In the illustrated embodiment, the slider switch 70 is designed to control the motor speed, and consequently, a blade assembly 72 inside the jar 24 from slow to chop, chop to mix, mix to puree, and puree to liquefy. It is contemplated that the slider switch 70 may have incremental activation points, or may include a continuous electrical switch that allows any of an infinite number of motor speeds.

Referring now to FIGS. 2 and 3, the inner componentry of the blending appliance 10 of the illustrated embodiment will be discussed. As illustrated, the blade assembly 72 of the blending appliance 10 is fixedly engaged with a jar drive shaft 80. The jar drive shaft 80 extends downward through a bottom portion of the jar 24 and is sealed by gaskets. The bottom of the jar drive shaft 80 is configured to engage a gear assembly 82 disposed below the jar 24. The gear assembly 82 is positioned above the support pad 22 in a gear housing 84. In the illustrated embodiment, there are three gears that relay rotational forces from the motor to the blade assembly. However, it is contemplated that more or less gears may be utilized in the blending appliance 10. In addition, it is also contemplated that a belt driven system may be utilized that requires less gears overall. In the illustrated embodiment, a jar drive gear 86 is disposed below the jar drive shaft 80. The jar drive gear 86 is rotatably engaged with a transition gear 88, which is operably engaged with a motor drive gear 90. The motor drive gear 90 is fixedly connected with a motor drive shaft 92 that extends downwardly from the motor 20. The motor drive shaft 92 is supported by a drive shaft bracket 94. The entire motor assembly is supported over a motor bracket 96 inside the motor compartment 14. In the illustrated embodiment, the motor 20 includes a magnet 98 and a winding assembly 100 that is protected by a motor shroud 102. The motor shroud 102 protects the motor 20 and keeps it free of moisture and debris. A shroud bracket 104 is disposed inside the motor shroud 102 and supports a fan assembly 106 disposed above the motor 20. The fan assembly 106 moves air inside the motor compartment 14, preventing or minimizing the likelihood of the motor 20 overheating.

Figure 4:
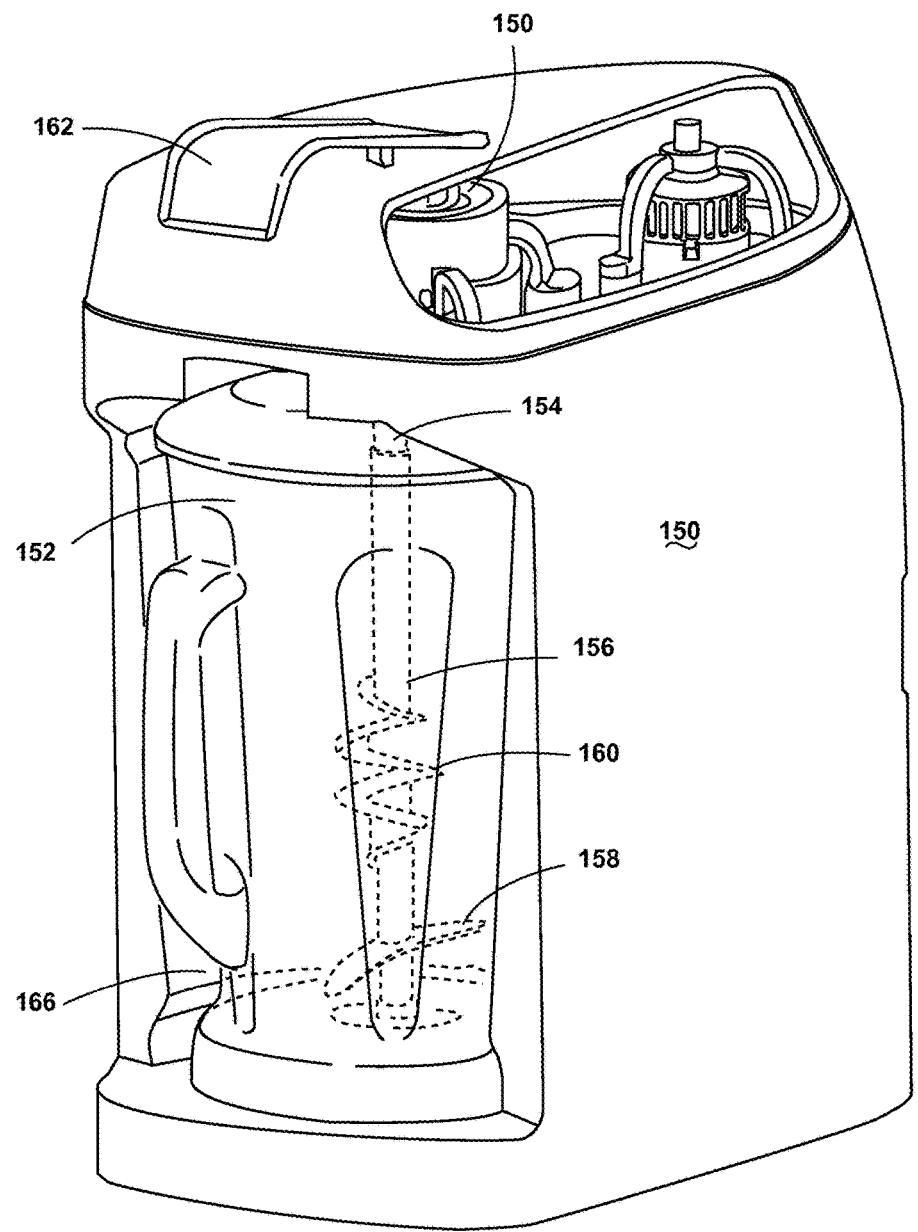
FIG. 4 is a top perspective view of another embodiment of a low profile side drive blending appliance.

Referring now to FIG. 4, in another embodiment, a blending appliance 140 includes a housing 148 and a motor system 150 positioned above a jar 152. The jar 152 includes a drive shaft 154 that is operably engaged with a vertically extending auger 156 that extends into the jar 152 under a lid 157 of the jar 152. The vertically extending auger 156 is fixedly engaged with a blade assembly 158 disposed at the bottom portion of the jar 152. The vertically extending auger 156 also includes a helical flange 160 that extends about a portion of the vertically extending auger 156, and which minimizes bridging of food during blending. A top portion of the housing 148 of the blending appliance 140 illustrated in FIG. 4 includes a locking tab 162 that locks the jar 152 and the vertically extending auger 156 in place in connection with the housing 148. In use, a user would insert the jar 152 into the housing 148 from a lateral direction. After insertion, the locking tab 162 would be moved to a lower locking position, such that the vertically extending auger 156 is engaged and the jar 152 is secured in place in a jar receiving portion 166 of the housing 148. At this point, a user is free to operate the motor system 150 at any of a variety of speeds as the lid 157 of the jar 152 is secure on the jar 152.

Figure 5:
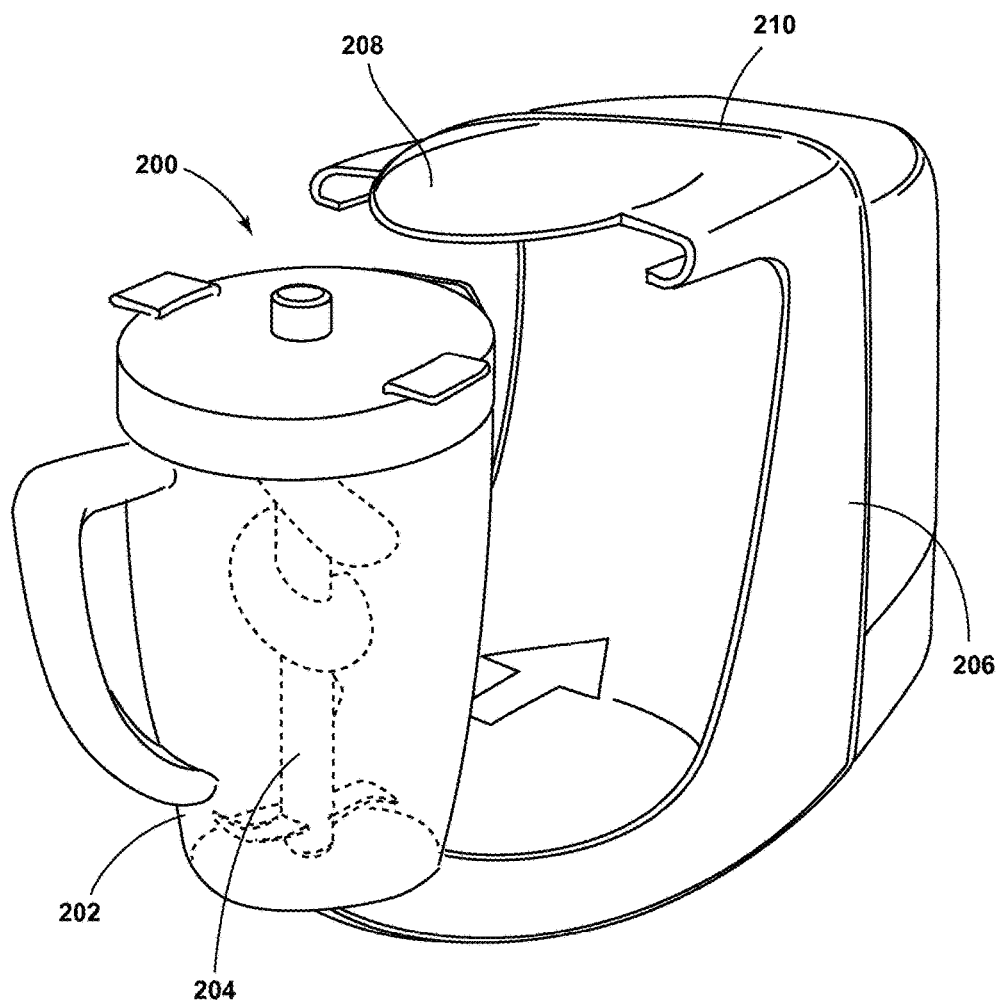
FIG. 5 is a top perspective view of yet another embodiment of a low profile side drive blending appliance.

In another embodiment, as illustrated in FIG. 5, a blending appliance 200 includes a jar 202 having an auger 204 disposed inside the jar 202. The jar 202 is configured for engagement with a housing 206 of the blending appliance 200. In this embodiment, the housing 206 includes an engagement member 208 that extends forward from a top portion 210 of the housing 206 and is configured to receive a top portion of the auger 204. Upon reception of the top portion of the auger 204, a motor system can be activated, which will subsequently turn the auger 204 inside the jar 202.

Figure 6:
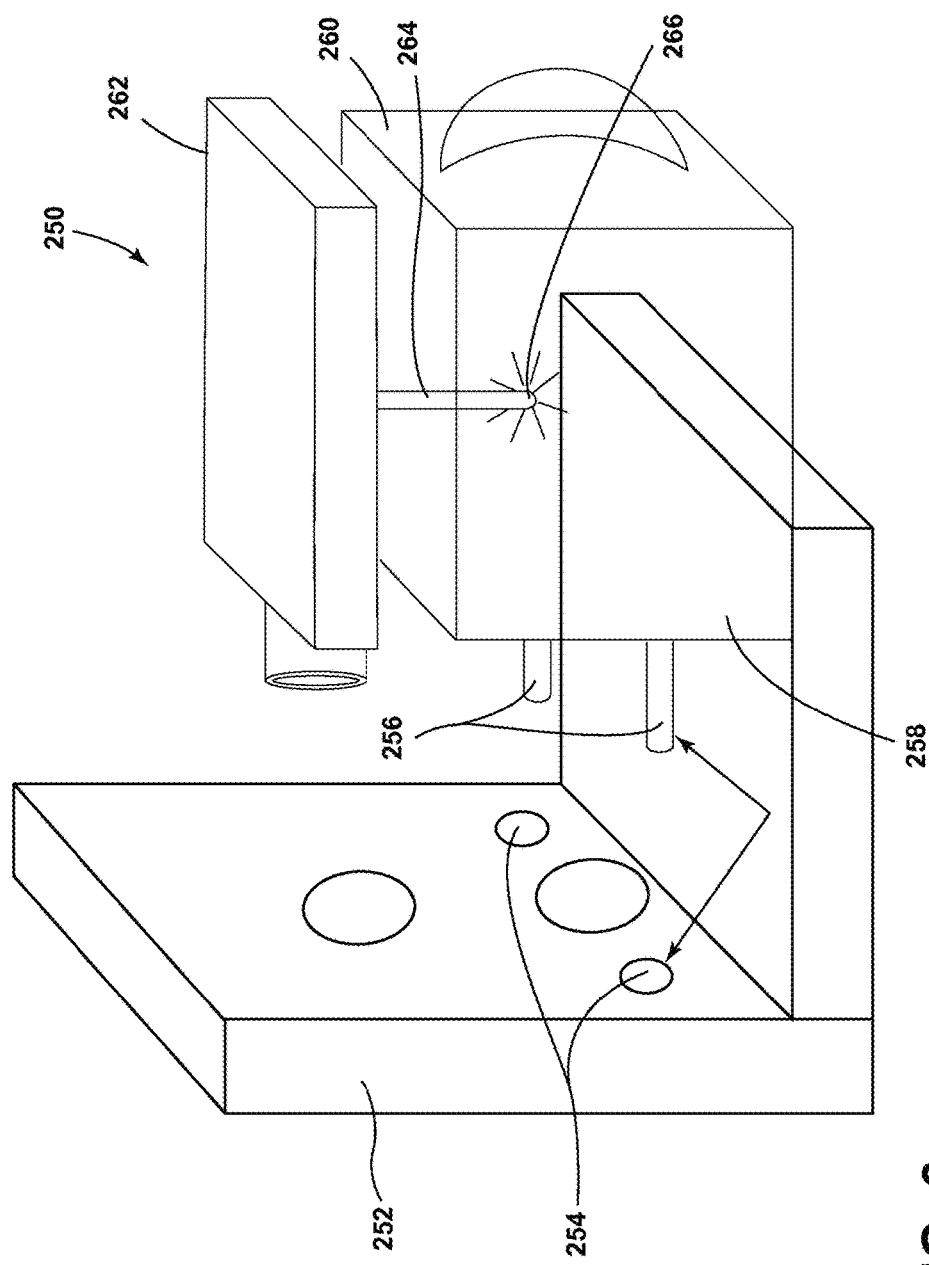
FIG. 6 is a side elevational view of yet another embodiment of a low profile side drive blending appliance.

With reference now to FIG. 6, in yet another embodiment, a blending appliance 250 includes a housing 252 with female receiving ports 254 configured to receive male extensions 256 that protrude from a base 258 of a blending jar 260. The male extensions 256 act as power relays configured to activate a heating element disposed in the base 258 of the blending jar 260. The base 258 of the blending jar 260 can then serve to warm food goods disposed inside the blending jar 260. Controls for a desired temperature of the heating element disposed in the blending jar 260 may be provided on the housing 252 of the blending appliance 250, or on the blending jar 260 itself. This embodiment also includes a top mounted motor system 262 with a drive shaft 264 that extends downward into the blending jar 260. The drive shaft 264 is operably coupled to a blade assembly 266.

Figure 7:
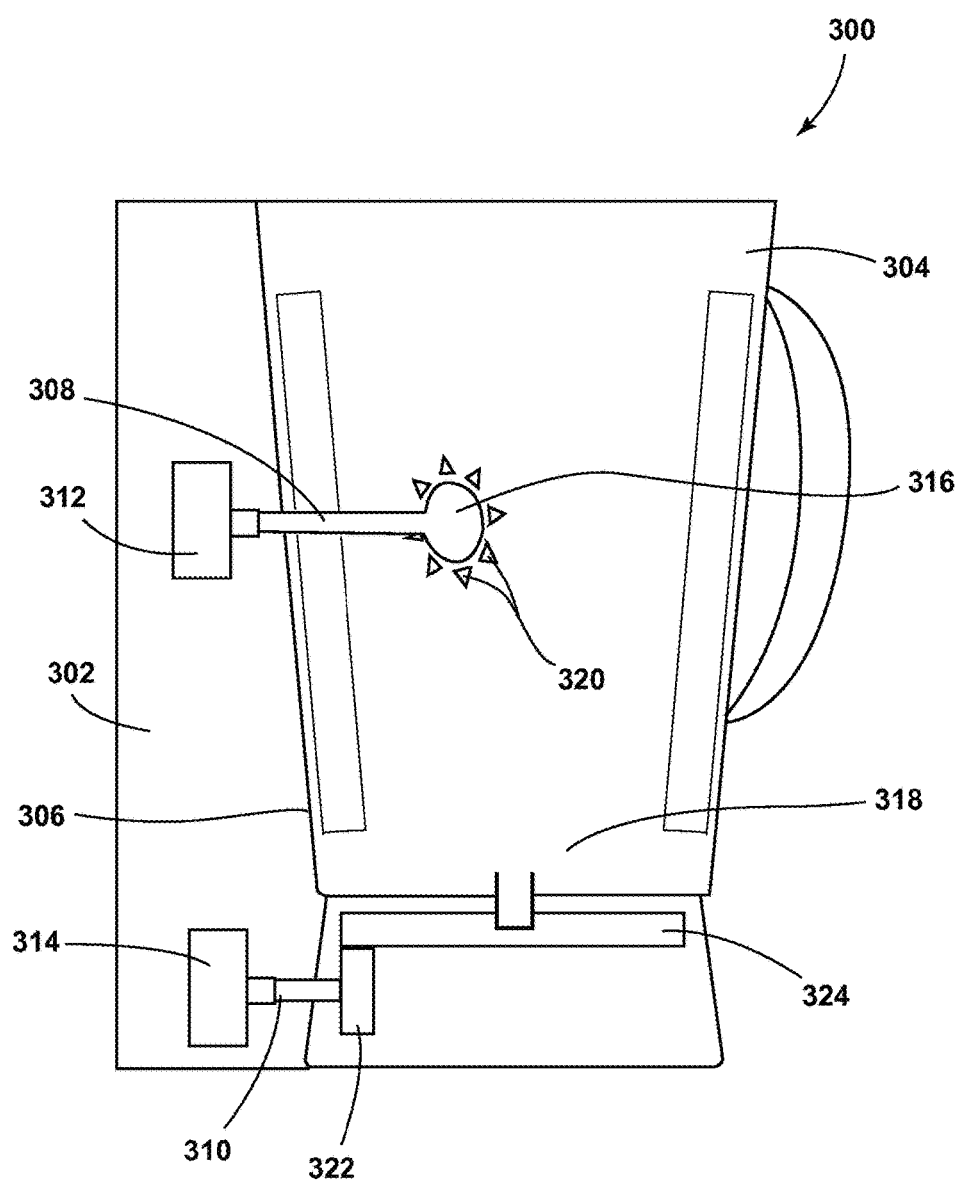
FIG. 7 is a top perspective view of yet another embodiment of a low profile side drive blending appliance.

Referring now to FIG. 7, in yet another embodiment, a blending appliance 300 includes a housing 302 and a blending jar 304 configured for lateral engagement with the housing 302. The blending jar 304 can be fit into a jar receiving portion 306 of the housing 302. As the blending jar 304 slides into the jar receiving portion 306 of the housing 302, upper and lower drive shafts 308, 310 that extend from the blending jar 304 engage first and second drive assemblies 312, 314, respectively, in the housing 302. Accordingly, food goods disposed inside the blending jar 304 can be blended by an upper blending assembly 316 operably coupled with the upper drive shaft 308, as well as a lower blending assembly 318 operably coupled with the lower drive shaft 310. The upper blending assembly 316 includes a plurality of blades 320. The lower blending assembly 318 includes a vertical transition gear 322 rotatably engaged with a horizontal drive gear 324 that is fixedly coupled with the lower blending assembly 318. Controls for operating the upper and lower blending assemblies 316, 318 can be disposed on either the housing 302 or the blending jar 304.

Figure 8A:
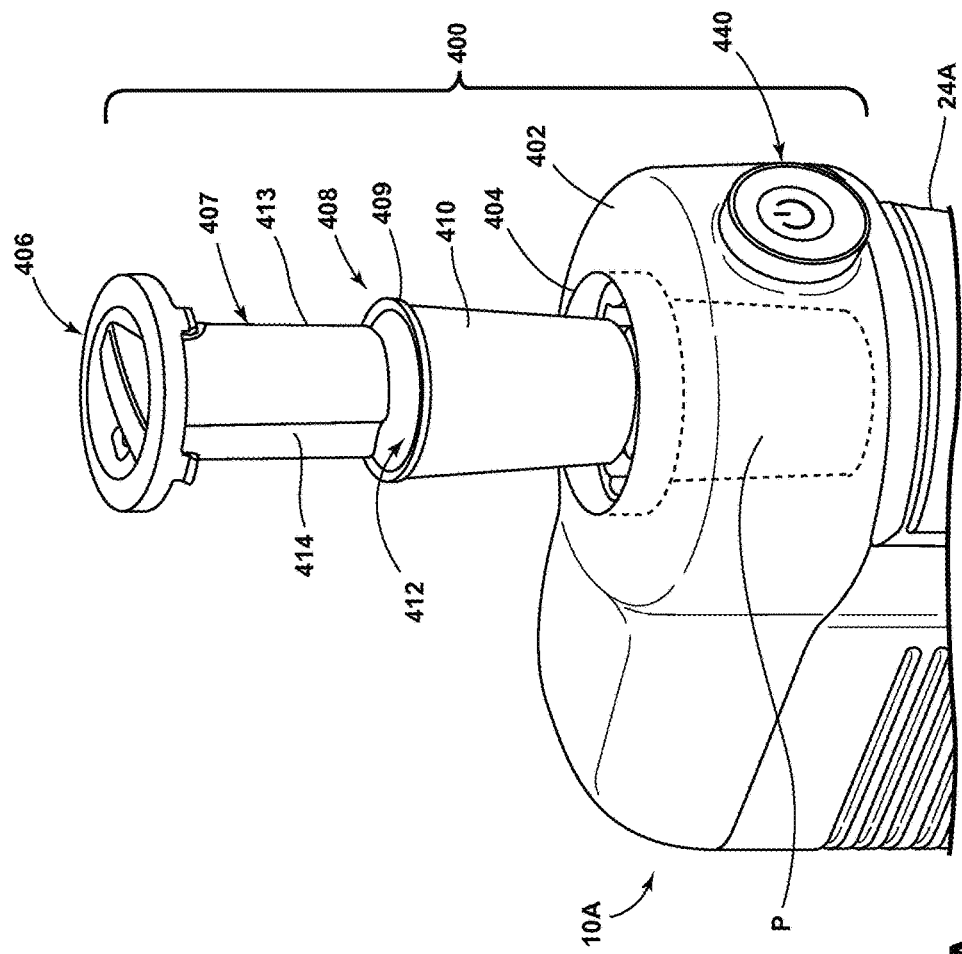
FIG. 8A is a top perspective exploded view of an upper housing and feed chute assembly.
Figure 8D:
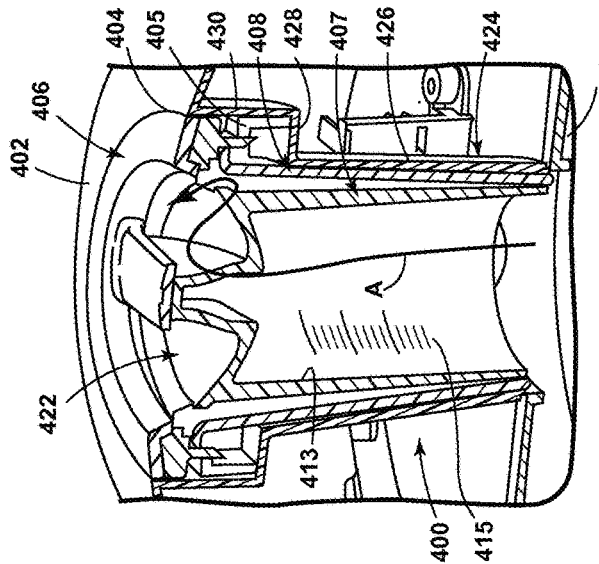
FIG. 8D is a cross-sectional perspective view of the feed chute assembly of FIG. 8B.
Figure 8B:
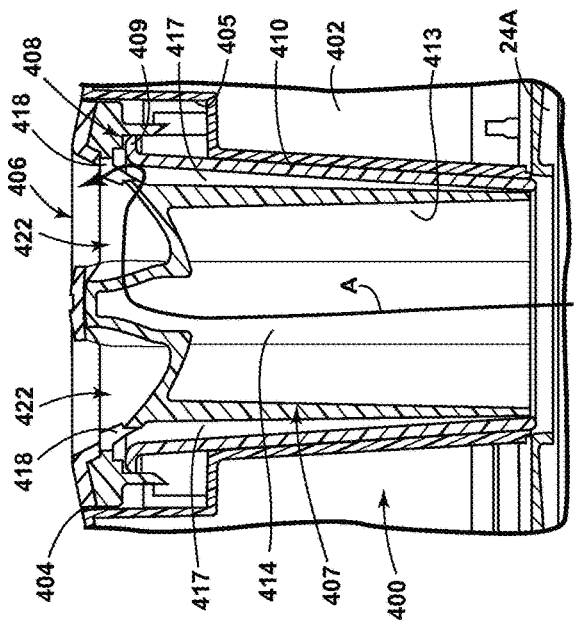
FIG. 8B is a cross-sectional view of the feed chute assembly of FIG. 8A as assembled.
Figure 8C:
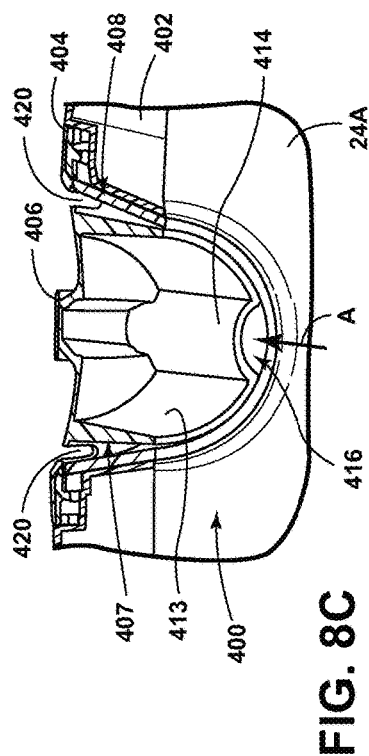
FIG. 8C is a cross-sectional view of the feed chute assembly of FIG. 8B.

Referring now to FIGS. 8A-8D, reference numeral 400 generally indicates a feed chute assembly for use in conjunction with another embodiment of a blending appliance 10A. As shown in FIG. 8A, the blending appliance 10A includes an upper housing 402 having a housing aperture 404 disposed therethrough. The feed chute assembly 400 includes a cap 406 which is adapted to close housing aperture 404 in assembly as shown in FIG. 8B. A cup assembly 407 is coupled to the cap 406 and is adapted to be received in a funnel member 408 which includes an upper lip portion 409 and a body portion 410. The body portion 410 generally defines a cavity 412 in which the cup assembly 407 is received. Together, the cup assembly 407 and funnel 408 define a feed chute or pathway P through the upper housing 402, which opens into a blender jar 24A. The cup assembly 407 includes a body portion 413 having channels 414 that substantially run the length of the body portion 413 of the cup assembly 407, such that in assembly, the channels 414 define a vent 416 between the cup assembly 407 and the body portion 410 of the funnel 408. This vented arrangement is best shown in FIGS. 8B and 8C as an arc-shaped vent as further described below.

Referring specifically to FIGS. 8B-8D, a venting path from the blender jar 24A through the feed chute assembly 400 is indicated by arrow A. The feed chute assembly 400 is adapted to vent air from the blender jar 24A as air or steam may be forced upwards towards the feed chute assembly 400. This pressure could remove a lid assembly that is not properly ventilated. As best shown in FIG. 8C, the cup assembly 407, as received in the funnel 408, forms a vent 416 disposed along the length of both the cup assembly 407 and funnel 408. The cup assembly 407 further includes radial clearance apertures 418 from which air can vent from the blender jar 24A towards the cap 406. As shown in FIG. 8B, the body portion 413 of the cup assembly 407 is spaced-apart from the body portion 410 of the funnel 408 to define a gap as indicated by reference number 417. Thus, air traveling through the vent 416 can escape around the periphery of the body portion 413 of the cup assembly 407 at the gap 417 towards the clearance apertures 418. Thus, as shown in FIGS. 8B and 8D, the venting path A forces the air to move vertically through vent 416 and then laterally from the vent 416 towards the clearance apertures 418. This lateral flow provides for a nonlinear pathway for air to vent from the blender jar 24A through the feed chute assembly 400. In this way, vented air, that may be carrying food particles, does not flow directly through the feed chute assembly 400 along a linear vertical path during use. The cap 406 also includes openings or vents 420 from which the air can ultimately escape. Openings 420 are disposed along a finger well 422 which is defined by the coupling of the cap 406 and cup assembly 407. Thus, the feed chute assembly 400 provides an aesthetically pleasing appearance while allowing venting through the feed chute assembly 400 without any visibly noticeable gaps between mating surfaces. Having clean mating surfaces, the feed chute assembly 400 has less potential for trapping food particles in the system as air is ventilated through the feed chute assembly 400. Further, the cup assembly 407 is removable, as shown in FIG. 8A, and can be inverted to define an ingredient measuring cup for use by the user. As shown in FIG. 8D, the interior portion of the body portion 413 of the cup assembly 407 includes volume indicators 415 for precise measuring of varying ingredients.

Referring again to FIG. 8D, the upper housing 402 includes a channel 424 which is comprised of a lower portion 426 which is generally tapered to frictionally receive the funnel 408 therein. A landing portion 428 is disposed between the lower portion 426 and an upper portion 430 of the channel 424. The landing portion 428 houses a twist-in locking mechanism 405 which, as shown in FIG. 8D, engages the cup assembly 407, thereby retaining both the cup assembly 407 and cap 406 in assembly. It is contemplated that the feed chute assembly 400 can couple to the blender jar 24A, such that the feed chute assembly 400 can be removed from the upper housing 402 and placed in a lid of the blender jar 24A as further described below.

Figures 11A, 11B:
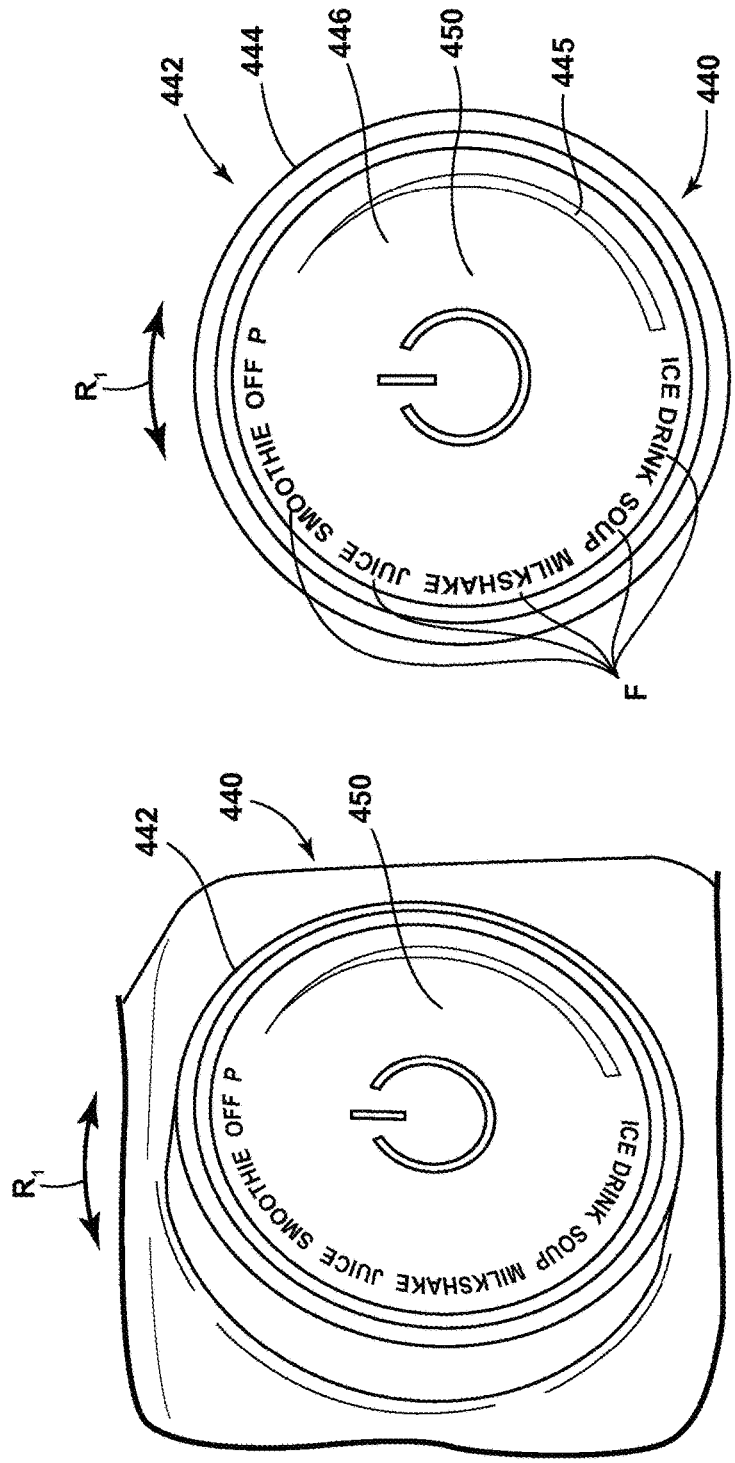
FIG. 11A is a top perspective view of the user-interface of FIG. 9.
FIG. 11B is a front elevational view of the user-interface of FIG. 9.

Referring now to FIG. 9, a user interface 440 is shown in the form of an exploded rotating dial assembly 442. The dial 442 generally includes an outer ring 444 which is engaged by a user and rotated along a rotational path $R_1$ as indicated in FIG. 11B. The outer ring 444 is disposed about a central aperture 446 of the dial 442 in which a central push button actuator 450 is disposed in assembly. Both the rotating dial 442 and push button actuator 450 may be comprised of a thermoset body portion having a metallic coating. In assembly, the push button actuator 450 remains stationary while the rotating dial 442 rotates along rotational path $R_1$. The stationary positioning of the push button actuator 450 is generally provided by a rotor post 452 engaging a rotary plate 454 through a slot 455 disposed thereon. The rotary plate 454 is disposed within a retainer 456 in assembly. A printed circuit board (PCB) 460 is mounted on a central portion of the rotary plate 454. The PCB 460 includes one or more LEDs 462 and a tactile switch 464. A plastic window 466 is aligned with the LEDs 462 of the PCB 460 and is further disposed within the push button actuator 450 in assembly. A biasing spring 470 is disposed between the push button actuator 450 and the rotary plate 454, thereby biasing the push button actuator 450 outwardly in a direction as indicated by arrow 472. In this way, the push button actuator 450 can be pushed by a user inwardly in a direction as indicated by arrow 474 to activate the tactile switch 464 disposed on the PCB 460. By engaging and pushing the push button actuator 450, the user makes a selection for a given function as determined by the rotating dial 442 as further described below.

As further shown in FIG. 9, a plurality of fasteners 480 are adapted to couple the rotary plate 454 to a mounting portion 447 of the rotating dial 442. As coupled together, the rotating dial 442 and rotary plate 454 are received within an interior portion 457 of the retainer 456. As best shown in FIG. 10, the retainer 456 is adapted to retain the user interface assembly 440 on a location disposed on the upper housing 402 via clips 458 which are resiliently flexible to engage the upper housing 402. A main PCB 490 includes a potentiometer 492 which is adapted to read an input from the user interface 440 for performing a preselected function of the blending appliance 10A. A plurality of fasteners 494 are adapted to couple the main PCB 490 to the retainer 456 via mounting portions 459 disposed on the retainer 456.

Referring now to FIGS. 11A and 11B, the user interface 440 includes a plurality of functions F which are disposed at discrete locations around the rotating dial 442. In use, a user will rotate the rotating dial 442 along the rotational path $R_1$ until a selected function F is disposed at a reference point which may be indicated by lighting up the particular function or by using an audible indicator. As shown in FIG. 11B, the functions F may include, but are not limited to, iced drink, soup, milkshake, juice, smoothie, as well as an OFF position, and a progressive blending speed indicator scale identified as reference numeral 445. Once the user has rotated the dial 442 to the selected function F, the user will push the central push button actuator 450 to initiate the specific function F. The design of the user interface 440 allows the rotating dial 442 to rotate a full 360 degrees in either direction along the rotational path $R_1$ while the center push button actuator 450 remains stationary. The user interface 440 is electronically coupled to a controller Referring now to FIGS. 12 and 13, a bearing assembly 500 is coupled to a metal blade assembly 501 having a plurality of blades 502. The blade assembly 501 is coupled to a shaft 504 by a fastener 506. The shaft 504 is pressed into and received within first and second radial bearing assemblies 510, 512. The first and second radial bearing assemblies 510 and 512 are in a vertically stacked configuration and are also separated by a spacer 514. The first and second radial bearing assemblies 510 and 512 are clearance-fit to a bearing housing 516 defined by the coupling of a retainer member 520 and a retaining nut 528. The retainer member 520 includes a threaded lower portion 522 which engages threaded retaining nut 528 in assembly. The retainer member 520 is adapted to be received within a receiving aperture 550 disposed within a lower portion of blender jar 24A between the receptacle portion 24C and a base portion 62B. The retainer member 520 further includes a head portion 524 which abuts the receiving aperture 550 in the blender jar 24A in assembly. Thus, the retainer member 520 and the retaining nut 528 are disposed on opposite sides of the receiving aperture 550 in an abutting manner to secure the bearing assembly 500 therein. A wave spring 532 is a compressible biasing mechanism that abuts a retainer clip 530 at an upper end, and further abuts the upper radial bearing assembly 510 at a lower end. The wave spring 532 is disposed around the shaft 504. The retainer clip 530 is disposed in an inset portion 526 within the bearing housing 516 of the retainer member 520. A seal 534 is disposed above the retainer clip 530 and is configured to seal the bearing assembly 500 from contents, such as various ingredients and liquids being processed, disposed in the receptacle portion 24C of the blender jar 24A in use. The wave spring 532, abutting the retainer clip 530 and the first bearing 510, imparts a constant downward force on the first and second bearings 510, 512 as indicated by arrow 552 while acting against the retaining clip 530. This constant downward force indicated by arrow 552 eliminates potential for outer housing rotation when the shaft 504 and blade assembly 501 are rotating in use. As further shown in FIG. 12, the threaded retaining nut 528 includes a lower brake surface 529 for use with a brake mechanism as further described below.

Figure 14:
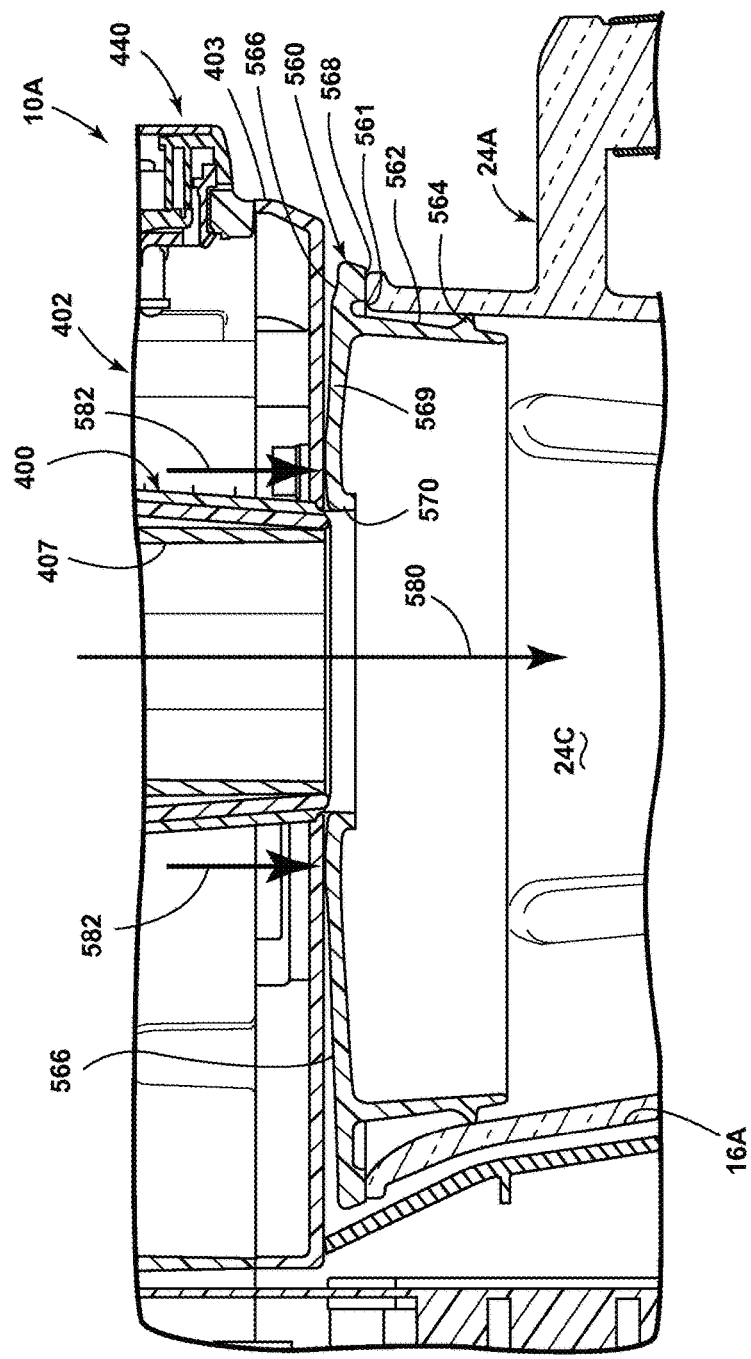
FIG. 14 is a cross-sectional view of an upper portion of a blender jar, cap and feed chute assembly.

Referring now to FIG. 14, the blending appliance 10A is shown with the blender jar 24A having a cover or lid 560 disposed on and received in an open top 561 of the blender jar 24A. The open top 561 of the blender jar 24A opens into the receptacle portion 24C of the blender jar 24A. The lid 560 is a flexibly resilient and removable lid having a lower ring portion 562 with a seal member 564 disposed around a periphery thereof. In assembly, the lower ring portion 562 is received within a receptacle portion 24C of the blender jar 24A. The lid 560 further includes an upper portion 566 with a central aperture 570. The central aperture 570 is disposed beneath the cup assembly 407 of the feed chute assembly 400 disposed within the upper housing 402. In this way, the feed chute assembly 400 is in communication with the receptacle portion 24C of the blender jar 24A along a food path as indicated by arrow 580. Further, the feed chute assembly 400 may be received in aperture 570 to close off aperture 570 when the blender jar 2A and lid 560 are removed from the blending appliance 10A, and to act as a feed chute directly into blender jar 2A. The lid 560 includes an outer edge portion 568 which abuts and seals against the open top 561 of the blender jar 24A. The outer edge portion 568 tapers upwardly via a ramped or raised portion 569 culminating at the central aperture 570 to define the upper portion 566 of the lid 560. The raised portion 569 contacts the upper housing 402 to form a seal there between. The upper housing 402 generally exerts a downward force on the lid 560 as indicated by arrow 582. This downward force or pressure 582 is realized on the lid 560 as the blender jar 24A is laterally inserted into a jar receiving portion or area 16A. A lower portion 403 of the upper housing 402 remains static as the blender jar 24A is received in the jar receiving area 16A, and the lid 560 is resiliently flexible, such that the raised portions 569 abut the generally planar lower portion 403 of the upper housing 402 to form a seal between the blender jar 24A and the upper housing 402 at aperture 570. In this way, positional tolerances are taken up as the lid 560 is always held down to the blender jar 24A during use by the engagement of the lid 560 with the upper housing 402. The constant downward force indicated by arrows 582 reduces the chances of the lid 560 becoming displaced from the open top 561 of the blender jar 24A due to food contents surging during the startup of a blending procedure, or other upward forces acting on the lid 560. Thus, the lid 560 is retained on the blender jar 24A when the blender jar 24A is received in the jar receiving area 16A of the housing 12A.

Referring now to FIG. 15, an interlock switch assembly 600 is shown. The interlock switch assembly 600 includes a switch housing 602 which is disposed within an interior 402A of the upper housing 402 of blending appliance 10A. The switch housing 602 includes a generally vertical portion 602A and a generally horizontal portion 602B. Disposed on the vertical portion 602A, one or more electrical air gap switch assemblies 604 are mounted, as shown in this embodiment, to mounting posts 606 and upper and lower clip mechanisms 608 and 610. In this way, one or more electrical switch assemblies 604 are snap-fit to the switch housing 602. The horizontal portion 602B of the switch housing 602 is secured to the lower portion 403 of the upper housing 402 via mounting cylinders 612, 614. The mounting cylinders 612, 614 are disposed on mounting posts 403A, 403B of the lower portion 403 of the upper housing 402. The horizontal portion 602B of the switch housing 602 is coupled to the mounting posts 403A and 403B using fasteners. A spring-biased rocker lever 620 is pivotally coupled to the horizontal portion 602B of the switch housing 602 above aperture 403C disposed in the lower portion 03 of upper housing 402. The lever 620 includes first, second, and third contact surfaces 622, 623, and 624, which are disposed along a periphery of a main body portion 626. The lever 620 is a spring-biased rocker lever which is operable between ON and OFF positions as further described below.

Referring now to FIGS. 16A and 16B, the interlock switch assembly 600 is shown with the switch housing 602 having the switch assembly 604, shown in FIG. 15, removed. The body portion 626 of the lever 620 includes an outwardly extending mounting rod 628 and a retention clip 630. A torsion spring 632 is mounted on the mounting rod 628 and includes an outwardly extending arm 634 which is retained by the retention clip 630 to bias the lever 620 to an "OFF" position as shown in FIG. 16A. As further shown in FIG. 16A, the mounting rod 628 is nested into a pivot cradle 636 disposed on the horizontal portion 602B of the switch housing 602. The torsion spring 632 biases the lever 620 to the OFF position in a direction as indicated by arrow 638. As shown in FIG. 16A, when the switch 620 is in the OFF position, the first contact surface 622 is disposed below the horizontal portion 602B of the switch housing 602 and extends through aperture 403C into the blender jar receiving area 16A. The second contact surface 623 abuts an abutment portion 603 disposed on the horizontal portion 602B to limit the movement of a lever 620 in the direction indicated by arrow 638.

Referring now to FIG. 16B, the lever 620 is shown in an "ON" position such that the lever 620 is adapted to articulate between ON and OFF positions along an arcuate path as indicated by arrow R$_2$. In the ON position, the torsion spring 632 is loaded and prepared to move the lever 620 to the OFF position as shown in FIG. 16A by a biasing force. When in the ON position, the third contact surface 624 of the lever 620 abuts an abutment portion 605 of the switch housing 602.

Referring again to FIG. 15, the lever 620 is moved to the ON position when the blender jar 24A is received in a jar receiving area 16A of the blending appliance 10A as further described above with reference to FIG. 14. The lid 560 of the blender jar 24A has an upper-most portion 569A disposed on the raised or ramped portion 569 of the lid 560. As the blender jar 24A is received in the jar receiving area 16A, the upper-most portion 569A of the lid 560 contacts the first contact surface 622 of the lever 620 which protrudes from aperture 403C of the lower portion 403 of the upper housing 402 into the jar receiving area 16A. This engagement between the rocker lever 620 and the lid 560 causes the lever 620 to move or rotate to the ON position as shown in FIGS. 15 and 16B. In the ON position, the lever 620 activates the air gap switch 604 to provide power to the blending appliance 10A as further described below. When the blender jar 24A is removed from the blending appliance 10A, the torsion spring 632 biases the lever 620 to the OFF position, such that the blending appliance 10A is cut-off from power by the interlock switch assembly 600. As further shown in FIG. 15, the third engagement surface 624 is adapted to contact a switch mechanism 607 disposed on the switch assembly 604 which in turn activates an activation button 609 to provide power to the blending appliance 10A when the lever 620 is in the ON position. In this way, the interlock switch assembly 600 is configured to selectively provide power to the blending appliance 10A by engagement with the blender jar 24A. It is further contemplated that in another embodiment the blender jar 24A can engage the rocker lever 620 without the lid 560 in place on the blender jar 24A.

Figure 17:
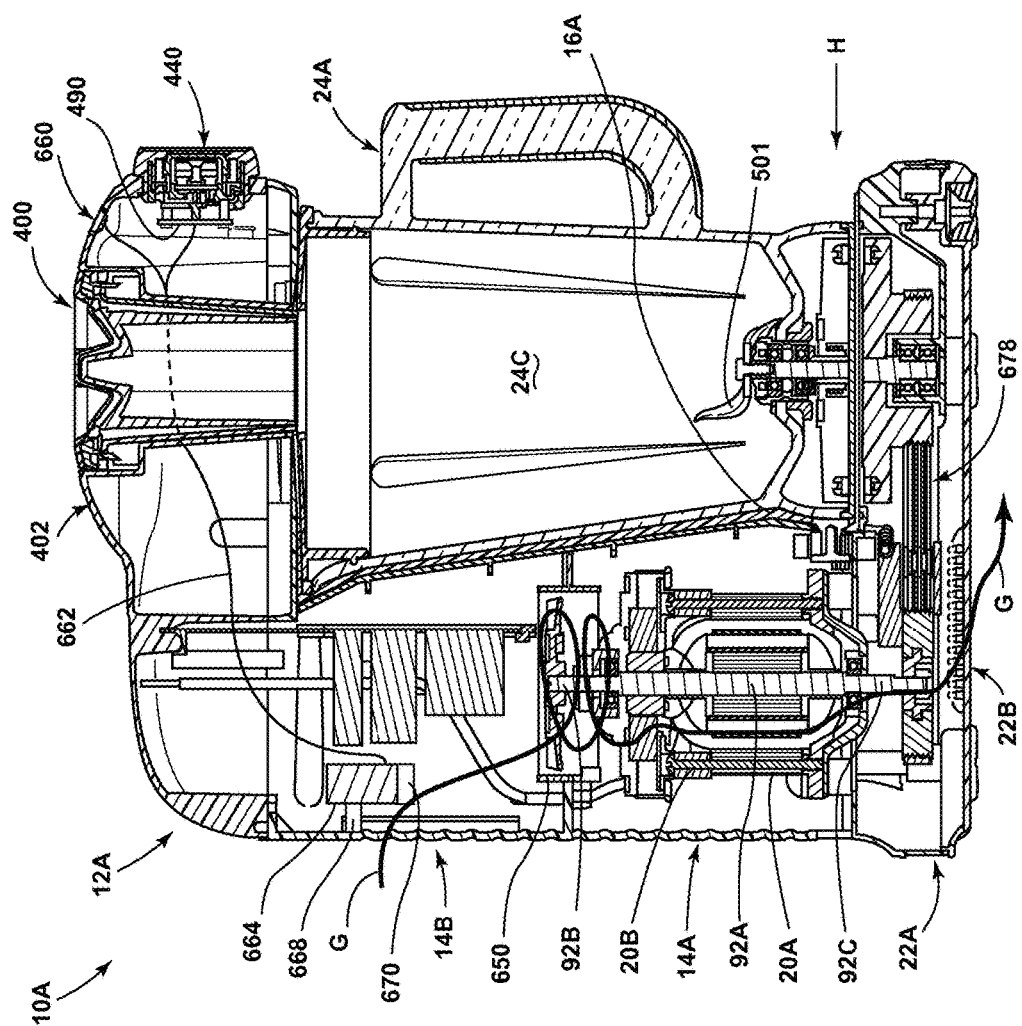
FIG. 17 is a cross-sectional view of yet another embodiment of a blending appliance.

Referring now to FIG. 17, the blender jar 24A is received in the blender jar receiving area 16A in a generally horizontal or lateral direction as indicated by arrow H. The blending appliance 10A, as shown in FIG. 17, also includes a motor compartment 14A which houses a motor 20A. The motor 20A is adapted to drive a motor drive shaft 92A having upper and lower portions 92B and 92C. In assembly, the lower portion 92C is adapted to drive the blade assembly 501 disposed within the receptacle portion 24C of the blender jar 24A through a belt drive system 678 as further described below. The upper portion 92B is coupled to a ducted fan 650 which operates in a similar manner to fan 106 described above with reference to FIG. 3. The fan 650 is adapted to draw air through a vented portion 14B of the motor compartment 14A, and then exhaust air through a vented portion 22B disposed on the support pad or base 22A along a venting path as indicated by arrow G. In this way, the vented portion 14B of the motor compartment 14A defines an air intake portion of the motor compartment 14A to draw air into the motor compartment 14A from an exterior environment of the blending appliance 10A. As indicated by arrow G, the air drawn from the intake or vented portion 14B of the motor compartment 14A is pulled towards the ducted fan 650 where it is then directed towards heat producing board components 20B of the motor 20A. The components 20B of the motor 20A generate heat during use of the blending appliance 10A. As the air is pushed through the motor compartment 14A, the air is exhausted out of the vented portion 22B of the support pad or base 22A as shown along the venting path indicated by arrow G. In this way, the ducted fan 650 is adapted to prevent or minimize the likelihood of the motor 20A overheating during the operation of a blending function of the blending appliance 10A. It is further contemplated that the fan 650 can be mounted to the lower portion 92C of motor drive shaft 92A to draw air through the motor compartment 14A.

Referring again to FIG. 17, the blending appliance 10A includes, in the illustrated embodiment, a speaker 660 which is disposed on the upper housing 402 adjacent the user-interface 440. The speaker 660 may be directly connected to the main PCB 490 of the user-interface 440 and may be coupled to a controller 664 through a lead 662 shown in FIG. 17. In the embodiment shown in FIG. 17, the controller 664 is housed within the motor compartment 14A, however, the controller 664 may be housed anywhere within the blending appliance 10A, such as the upper housing 402. The controller 664 is configured to store and run automated blending sequences or functions F (FIG. 11A) by controlling the speed of the motor 20A. Thus, the function settings F correlate to preprogrammed blending sequences stored in the controller 664. The speaker 660 is adapted to provide an audible tone which may signal the completion of a specific function, such as any one of the functions F as described above with reference to FIGS. 11A-11B. In use, it is contemplated that the user-interface 440 would be used to select a function F that would be relayed through the user-interface lead 662 to the controller 664 which will then electronically relay a signal to speaker 660 to audibly indicate the status of a function F of the blending appliance 10A. The status may indicate the completion of a function F, or may further indicate that a setting is incorrect, such as the blender jar 24A not being fully received in the jar receiving area 16A.

Thus, the controller 664 includes a number of audio files that can be played through the speaker 660.

As further shown in FIG. 17, the controller 664 may also be coupled to a USB port 668 such that the blending appliance 10A may be coupled to another electronic device, such as a portable electronic device, for loading different blending functions, programs or other protocols into the controller 664. A wireless receiver 670 is also shown in FIG. 17 which may be used to wirelessly couple the controller 664 of the blending appliance 10A to a data-transfer protocol of a portable electronic device to load recipes, various audible tones, instruction information, use and care guides, and other such remote files that can be stored in the controller 664 and audibly played through the speaker 660. The wireless receiver 670 can also be used to wirelessly upload preprogrammed blending sequences to the controller 664.

Figure 18:
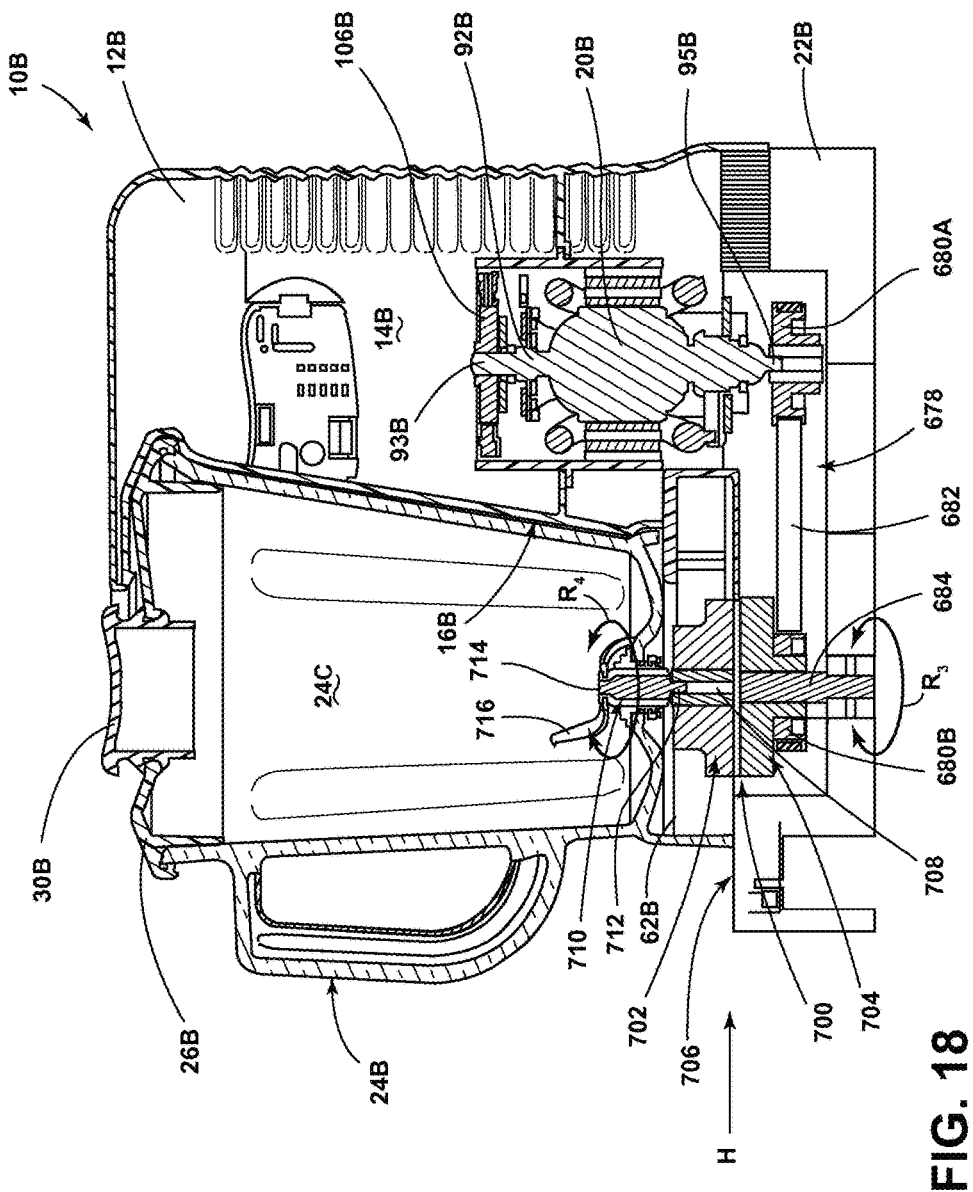
FIG. 18 is a cross-sectional view of yet another embodiment of a blending appliance.

Referring now to FIG. 18, another embodiment of a blender apparatus 10B is shown having a number of features which are similar to the blending appliance 10 and 10A described above. Thus, similar reference numerals will be used for like components using the suffix "B." Referring now to FIGS. 18-19, blending appliance 10B generally includes a housing 12B having a motor compartment 14B and a jar receiving area 16B. A motor 20B is disposed in the motor compartment 14B and a support pad or base 22B is operably coupled to the housing 12B. A blender jar 24B includes a lid 26B having a feed chute 30B. The blender jar 24B and lid 26B are configured to be received in the jar receiving area 16B in a lateral direction as indicated by arrow H. As noted above, most traditional blending appliances include a construction that mandates vertical or drop-in placement of a jar onto a base that includes a motor therein. These types of constructions generally require substantial vertical space above the base to couple the jar to the base and for mechanically connecting the blades of the jar with a drive mechanism. The driving of the blending mechanism of the embodiment shown in FIGS. 18-19, does not require such a mechanical coupling as further described below.

With specific reference to FIG. 18, the blending appliance 10B includes a motor drive shaft 92B which is rotatably driven by the motor 20B and further includes an upper end 93B and a lower end 95B. The upper end 93B is coupled to and adapted to drive an exhaust fan 106B to ventilate the motor compartment 14B. The lower end 95B of motor drive shaft 92B is adapted to power or drive a first pulley 680A which is connected to a second pulley 680B via a belt 682 in the belt drive system 678. The second pulley 680B is coupled to a shaft 684 which is adapted to rotate along a rotational path $R_3$ as powered by the motor 20B through the belt drive system 678. A magnetic coupling system 700 includes upper and lower magnetic couplers 702 and 704. The lower magnetic coupler 704 is coupled to shaft 684 and is disposed within the support base 22B of the blending appliance 10B. The lower magnetic coupler 704 is rotatably disposed adjacent to a receiving deck 706 of the jar receiving area 16B which encapsulates the lower magnetic coupler 704 within the support base 22B. The second pulley 680B may be an integrated part of the lower magnetic coupler 704, or may be a separate part disposed on a shared drive shaft, such as shaft 684. The upper magnetic coupler 702 is rotatably disposed within a base portion 62B of the blender jar 24B. The upper magnetic coupler 702, as disposed within the base portion 62B of the blender jar 24B, is removable from the blending appliance 10B when the blender jar 24B is removed from the jar receiving area 16B. The upper magnetic coupler 702 is coupled to a shaft 708 which is further coupled to a drive shaft 710 at a lower end 712. An upper end 714 of the drive shaft 710 is connected to a blade assembly 716 which is fully disposed within a receptacle portion 24C of the blender jar 24B. Drive shaft 710 and shaft 708 are shown in FIG. 18 as separate parts, but may be combined to form a unitary drive shaft for rotating the upper magnetic coupler 702 and blade assembly 716. As further shown in FIG. 18, the magnetic coupling system 700 magnetically couples the blender jar 24B to the base portion 22B of the blending appliance 10B through the magnetic attraction generated between upper and lower magnetic couplers 702, 704, as further described below. As shown in the embodiment of FIG. 18, the upper and lower magnetic couplers 702, 704, have a generally circular or disc configuration at a prescribed diameter, such that the blender jar 24B will properly seat on the receiving deck 706 due to the magnetic coupling and attraction forces between the upper and lower magnetic couplers 702, 704. In assembly, the motor 20B drives the belt 682 of the belt drive system 678, as described above, thereby driving the shaft 684 in a direction as indicated by arrow $R_3$. This driving action powered by the motor 20B drives the lower magnetic coupler 704 along the rotational path indicated by arrow $R_3$ as coupled to the shaft 684. Due to the magnetic coupling of the lower magnetic coupler 704 to the upper magnetic coupler 702, the upper magnetic coupler 702 rotates along with the rotation of the upper magnetic coupler 704. As the upper magnetic coupler 702 rotates, the drive shaft 710, coupled thereto, also rotates in a direction as indicated by arrow $R_4$ which corresponds to the rotational path $R_3$ of the lower magnetic coupler 704. In this way, the upper and lower magnetic couplers 702, 704 drive the blade assembly 716 disposed within the receptacle portion 24C of the blender jar 24B through a magnetic torque coupling, rather than a conventional mechanical coupling. The magnetic coupling system 700 is contemplated for use with all versions of the blending appliance herein.

In another embodiment, referring to FIG. 18, the magnetic coupling system 700 magnetically couples the blender jar 24B to the base portion 22B of the blending appliance 10B through inductance and magnetic reluctance generated between upper and lower couplers 702 and 704. In assembly, the motor 20B drives the belt 682 of the belt drive system 678, as described above, thereby driving the shaft 684 in a direction as indicated by arrow $R_3$. This driving action powered by the motor 20B drives the lower magnetic coupler 704 along the rotational path indicated by arrow $R_3$ as coupled to the shaft 684. The rotating lower coupler made from an array of permanent magnets generates a rotation magnetic field. The upper coupler made from electrically conductive copper or copper alloy will react with this field through inductance. The electrical current generated in the upper coupler 702 produces a magnetic field that is opposite from the field produced by the lower coupler 704. Due to magnetic induction the upper coupler will rotate in the same direction as the lower coupler 704 as indicated by arrow $R_3$. As the upper magnetic coupler 702 rotates, the drive shaft 710, coupled thereto, also rotates in a direction as indicated by arrow $R_4$ which corresponds to the rotational path $R_3$ of the lower magnetic coupler 704. In this way, the upper and lower magnetic couplers 702, 704 drive the blade assembly 716 disposed within the receptacle portion 24C of the blender jar 24B through a magnetic torque coupling, rather than a conventional mechanical coupling. The magnetic coupling system 700 is contemplated for use with all versions of the blending appliance herein.

Figure 19:
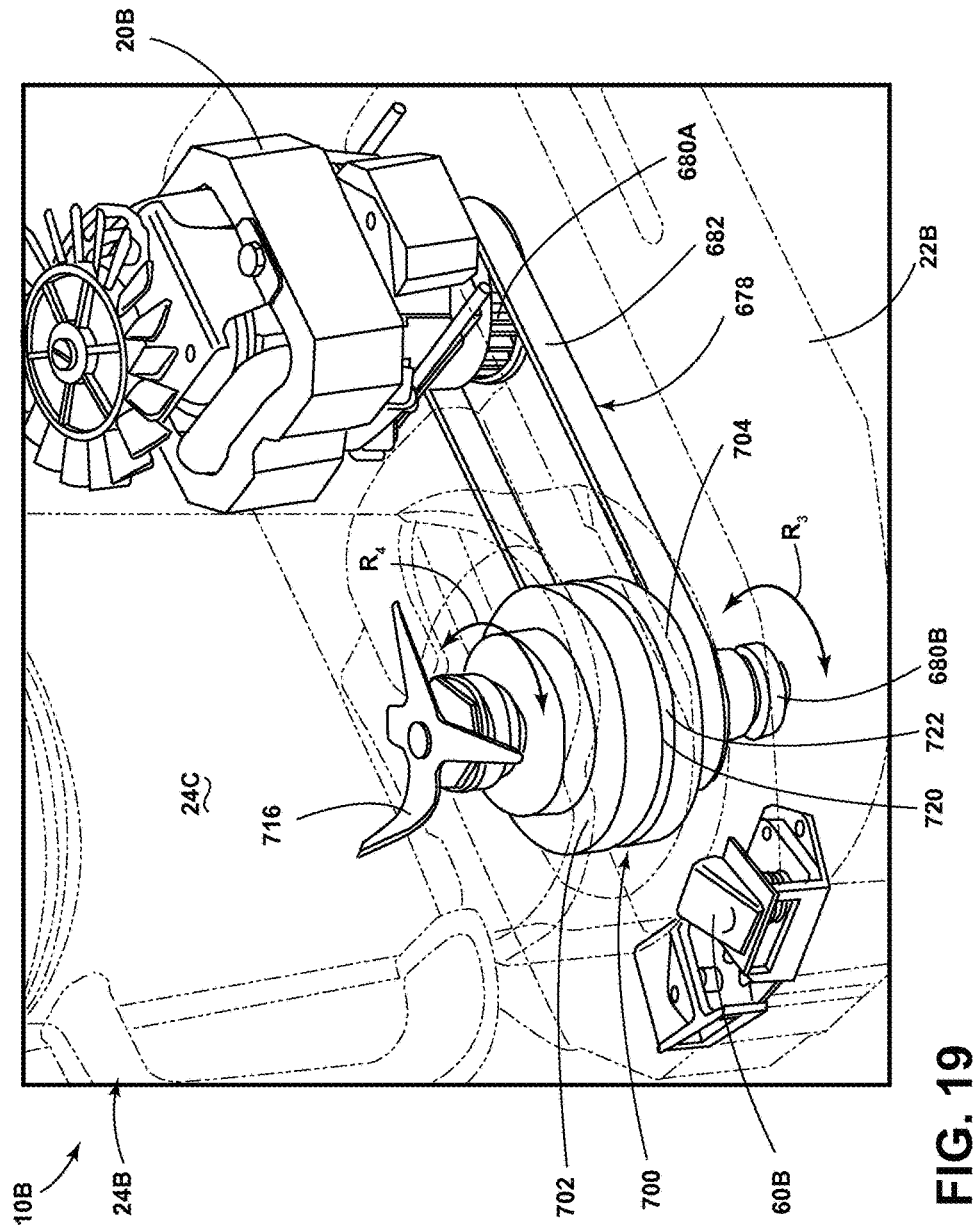
FIG. 19 is a top perspective view of the blending appliance shown in FIG. 18.

Referring specifically to FIG. 19, the motor 20B, as shown, is coupled to the belt drive system 678 at first pulley 680A which is further connected to second pulley 680B via belt 682 as described above. In the embodiment shown in FIG. 19, the blending appliance 10B includes a slide lock 60B which operates in a manner similar to slide lock 60 as described above with reference to FIG. 2. In the configuration shown in FIG. 19, the upper and lower magnetic couplers 702, 704 are in the form of coupler discs having stepped portions. The coupler discs 702, 704 may be comprised of a magnetic material or may be in the form of a polymeric housing which includes a plurality of magnetic elements or a solid magnetic rings disposed along interfacing surfaces 720, 722 of the upper and lower magnetic couplers 702, 704 respectively.

Figure 20A:
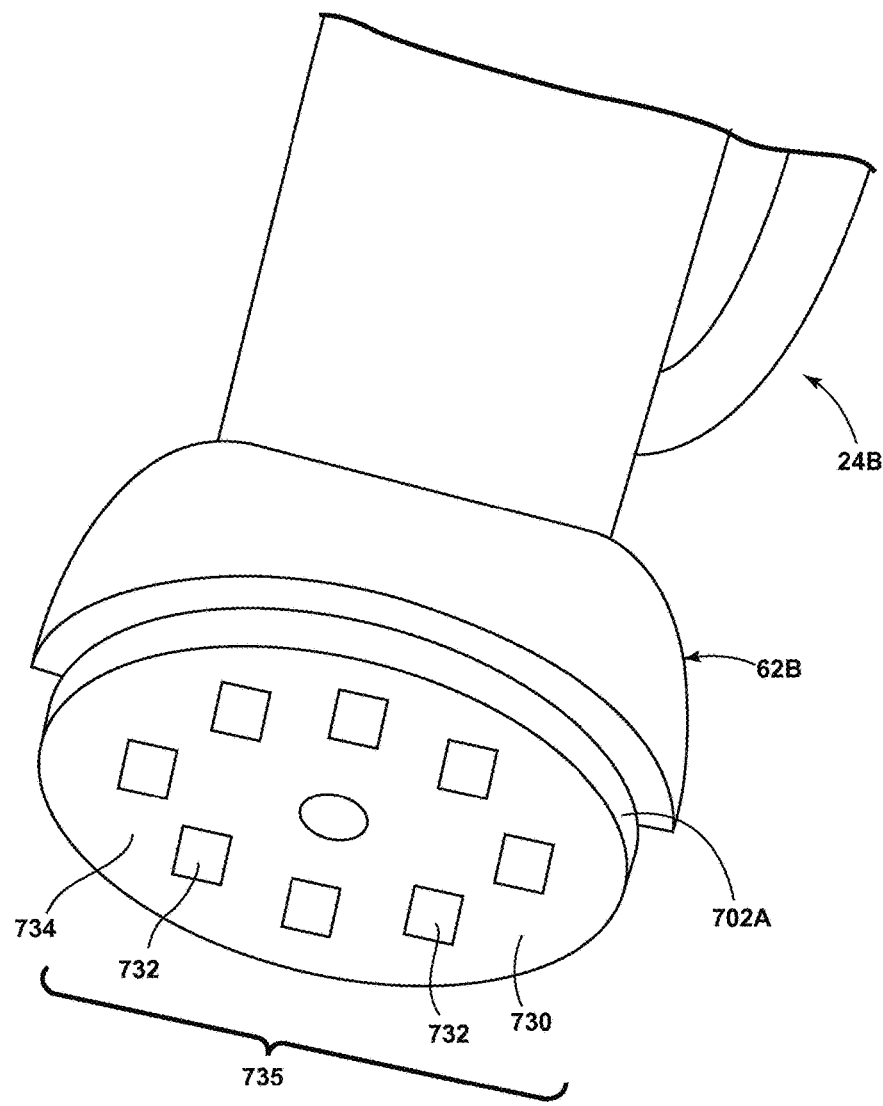
FIG. 20A is a rear perspective view of a base portion of a blender jar.
Figure 20B:
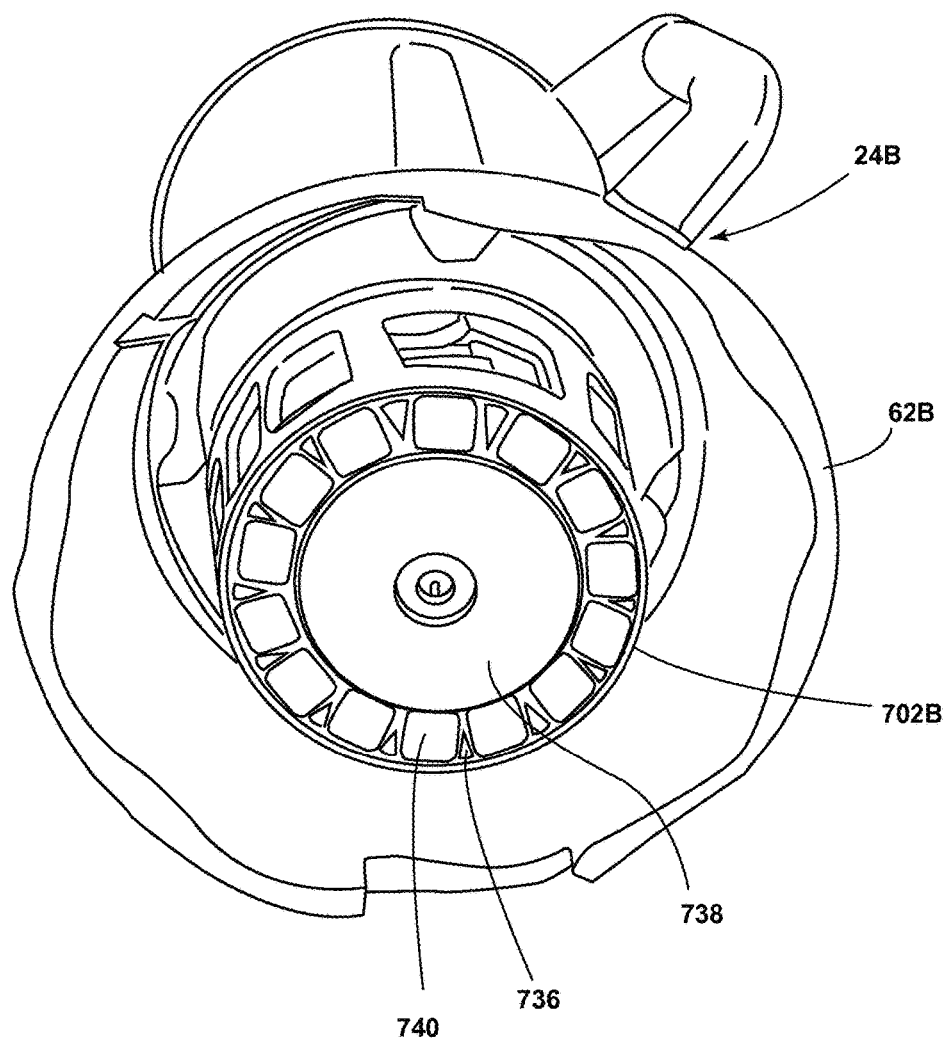
FIG. 20B is a rear perspective view of another embodiment of a base portion of a blender jar.

Referring now to FIGS. 20A and 20B, the base portion 62B of blender jar 24B is shown having upper magnetic coupler 702A rotatably disposed therein. The upper magnetic coupler 702A includes a generally planar body portion 730 in the form of a disc having a plurality of magnetic elements 732 disposed along a periphery 734 of the disc 730. The magnetic elements 732 are disposed about the periphery 734 to define a magnetic array 735. As shown, the magnetic elements 732 are individual magnetic elements which are separated by portions of the disc 730 which is contemplated to be made of a non-magnetic polymeric material. In the embodiment shown in FIG. 20B, the upper magnetic coupler 702B includes a disc 736 having a plurality of magnets 738 disposed within an outer channel 740 of the disc 736. In this configuration, the individual magnetic elements 738 are aligned on a metallic disc 736 in the channel 740, such that the magnetic elements 738 are not individually separated by a polymeric material, such as found in the embodiment of FIG. 20A. While the configurations shown in FIGS. 20A and 20B include a plurality of individual magnetic elements, it is contemplated that the magnetic elements 732, 738, as disposed in the upper and lower coupling mechanisms 702, 704, may be comprised of continuous metallic rings, or other like shapes, defining upper and lower magnetic arrays to sufficiently magnetically couple the upper and lower magnetic couplers 702, 704 in the magnetic coupling system 700. Further, it is contemplated that the magnetic elements 732, 738 are permanent magnetic elements. The permanent magnets 732, 738 are "permanent" in that they create their own magnetic field which persists against influences which might otherwise demagnetize them.

Figure 21:
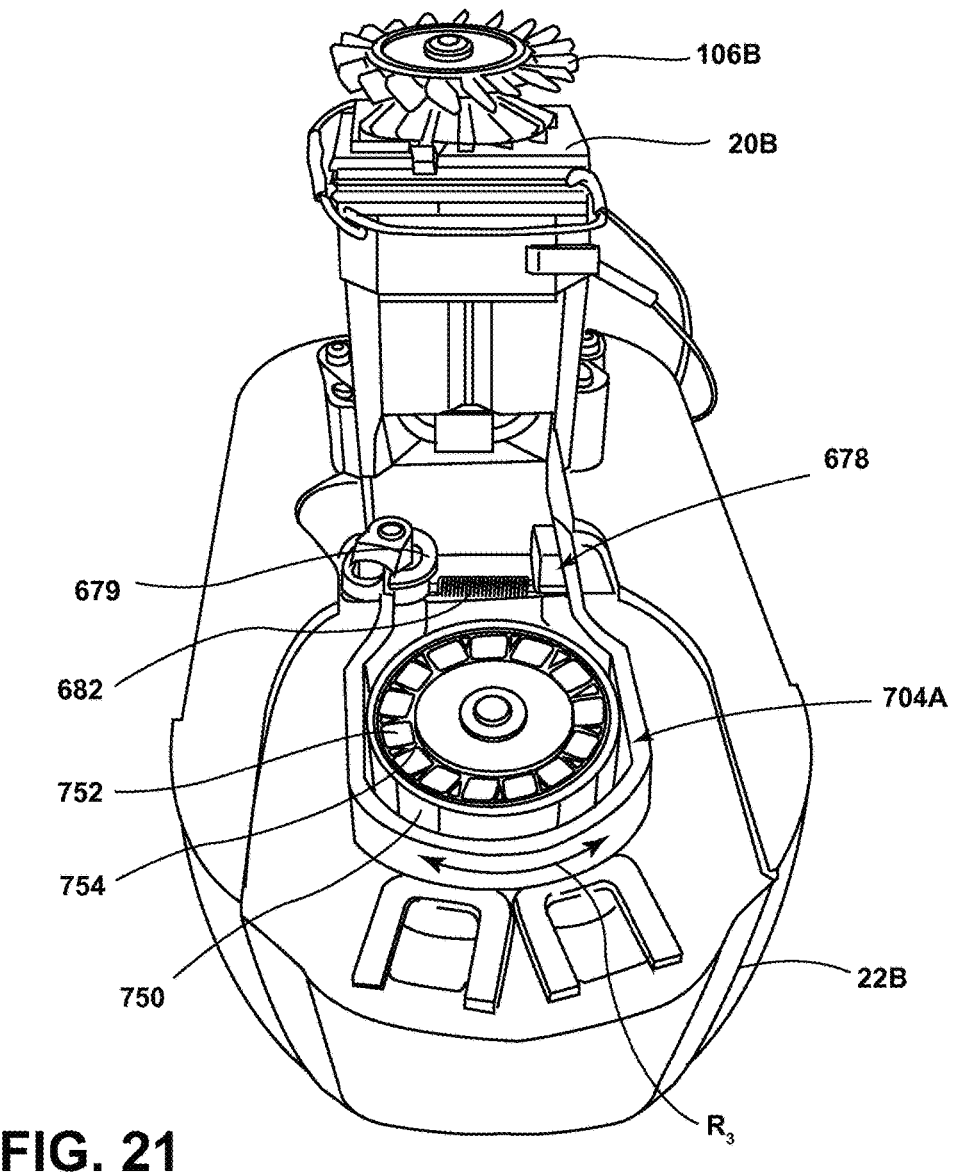
FIG. 21 is a top perspective view of another embodiment of a base portion of a blender appliance.

Referring now to FIG. 21, a base 22B and motor 20B are shown with the belt drive system 678 coupled to the motor 20B and further coupled to another embodiment of a lower magnetic coupler 704A. In this embodiment, a tensioner pulley 679 is incorporated into the belt drive system 678 to reduce slack within the belt 682. As further shown in this embodiment, the lower magnetic coupler 704A includes a disc portion 750 having a plurality of magnetic elements 752 disposed within an outer channel 754 of the disc 750. The magnetic array of magnetic elements 752 shown in this embodiment is akin to the magnetic array of magnetic elements 738 shown in FIG. 20B. Again, as noted above, the motor 20B is adapted to drive the lower magnetic coupler 704A in a direction as indicated by arrow $R_3$.

With regards to the magnetic coupling system 700, as shown and described above, it is contemplated that a plurality of nonmagnetic layers will exist between the upper and lower coupling mechanisms 702, 704. Such nonmagnetic layers may be disposed on the support base 22B of the blending appliance 10B, or may be included on the base portion 62B of the blender jar 24B, or both. In this way, the magnetic elements disposed within the upper and lower magnetic couplers 702, 704 do not directly contact one another, such that the torque provided by the lower magnetic coupler 704 will transfer to the upper magnetic coupler 702 purely through magnetic attraction forces that exist across the nonmagnetic layers as further described below.

Referring now to FIG. 22A, blender jar 24B is shown having a blade assembly 716 disposed within a receptacle portion 24C of the blender jar 24B. In this embodiment, the blade assembly 716 is coupled to a bearing assembly 500 through a drive shaft 710 which is further coupled, at a lower portion 712 thereof, to another embodiment of an upper magnetic coupler 702C. As further shown in this embodiment, the upper magnetic coupler 702C is part of magnetic coupling system 700C, and generally includes, a disc or carrier 736C having a channel 740C disposed around a periphery thereof. The carrier 736C is comprised of a nonmagnetic material, such as a polymeric substance suitable for use with the blender jar 24B. As further shown in FIG. 22A, a backing plate 780 is disposed within the channel 740C and is coupled to a magnetic element 738C, wherein the magnetic element 738C defines an upper magnetic array. The backing plate 780 may include any magnetic soft material or magnetizable material, such as a mild steel backing plate, suitable to provide for efficiencies in the magnetic coupling system 700C as further described below. The backing plate 780 may be a continuous backing plate disposed throughout the channel 740C of the carrier 736C. Further, it is contemplated that the magnetic element 738C may be made up of discrete magnetic elements or a continuous magnetic ring disposed within the channel 740C. As further shown in FIG. 22, the upper magnetic coupler 702C is rotatably disposed within a base portion 62C of the blender jar 24B. The base portion 62C includes a lower bottom wall 782 that closes off the base portion 62C to form a sealed cavity 784 in which the upper magnetic coupler 702C is disposed. An air gap 786 is disposed between the upper magnetic coupler 702C and the bottom wall 782 of the base portion 62C, such that the bottom wall 782 and the air gap 786 provide exemplary embodiments of the plurality of nonmagnetic layers disposed between the upper magnetic coupler assembly 702C and a lower magnetic coupler 704C (FIG. 23), as further described below.

Figure 22B:
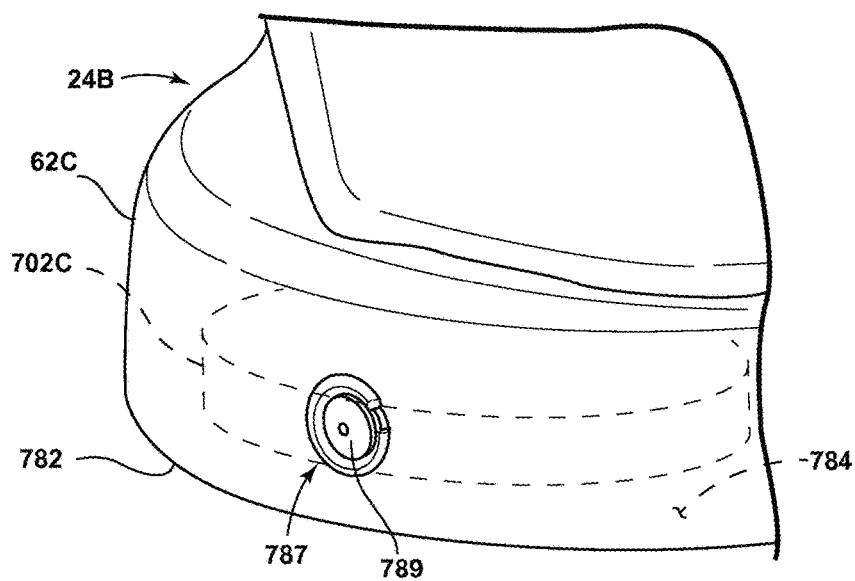
FIG. 22B is a fragmentary perspective view of the blender jar of FIG. 22A showing a base portion vent member.
Figure 22C:
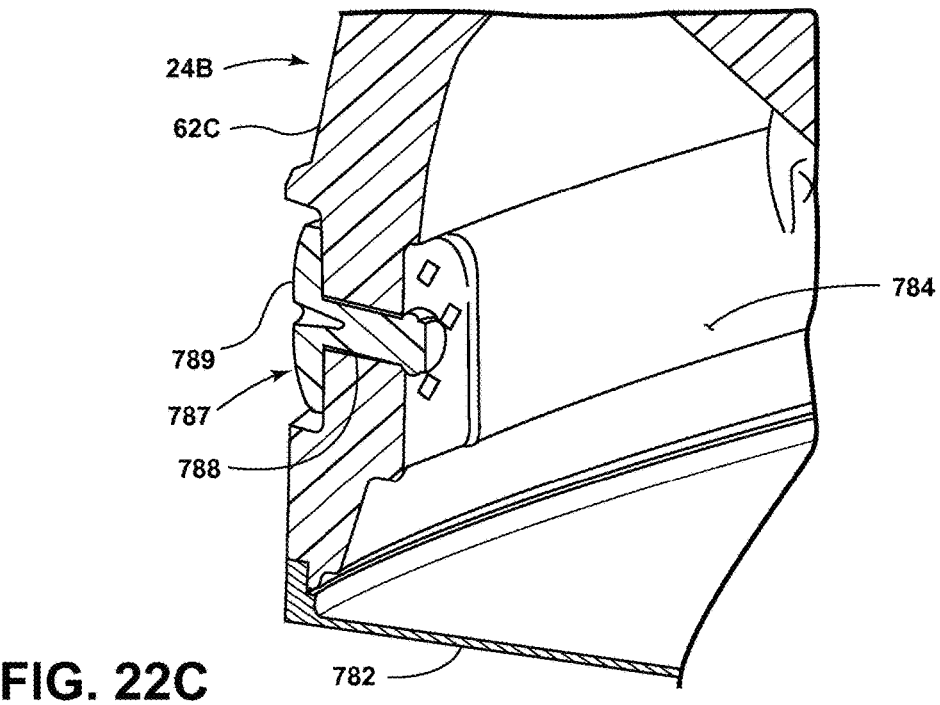
FIG. 22C is a cross-sectional view of the base portion of the blender jar shown in FIG. 22B.

Referring now to FIGS. 22B and 22C, the base portion 62C of blender jar 24B is configured to house the upper magnetic coupler 702C within the sealed cavity 784 for rotation therein. As the upper magnetic coupler 702C rotates within the sealed cavity 784, heat is generated, such that pressure can build-up within the sealed cavity 784. Thus, as shown in FIG. 22B, a venting system 787 is disposed on the sidewall of the base portion 62C which generally includes an aperture 788, shown in FIG. 22C, formed through the sidewall of the base portion 62C having a one-way valve 789 disposed therein. In assembly, the venting system 787 is configured to allow for air to pass from the sealed cavity 784 to the outside environment through the valve 789. In this way, as heat is generated by the movement of the upper magnetic coupler 702C within the sealed cavity 784 to build-up pressure therein, that pressure can be relieved through the venting system 787 which is shown in FIGS. 22B and 22C as a one-way check valve 789. It is further contemplated that the valve 789 can be a membrane which covers aperture 788, so long as the membrane allows for pressure equalization from the sealed cavity 784 in use.

Figure 23:
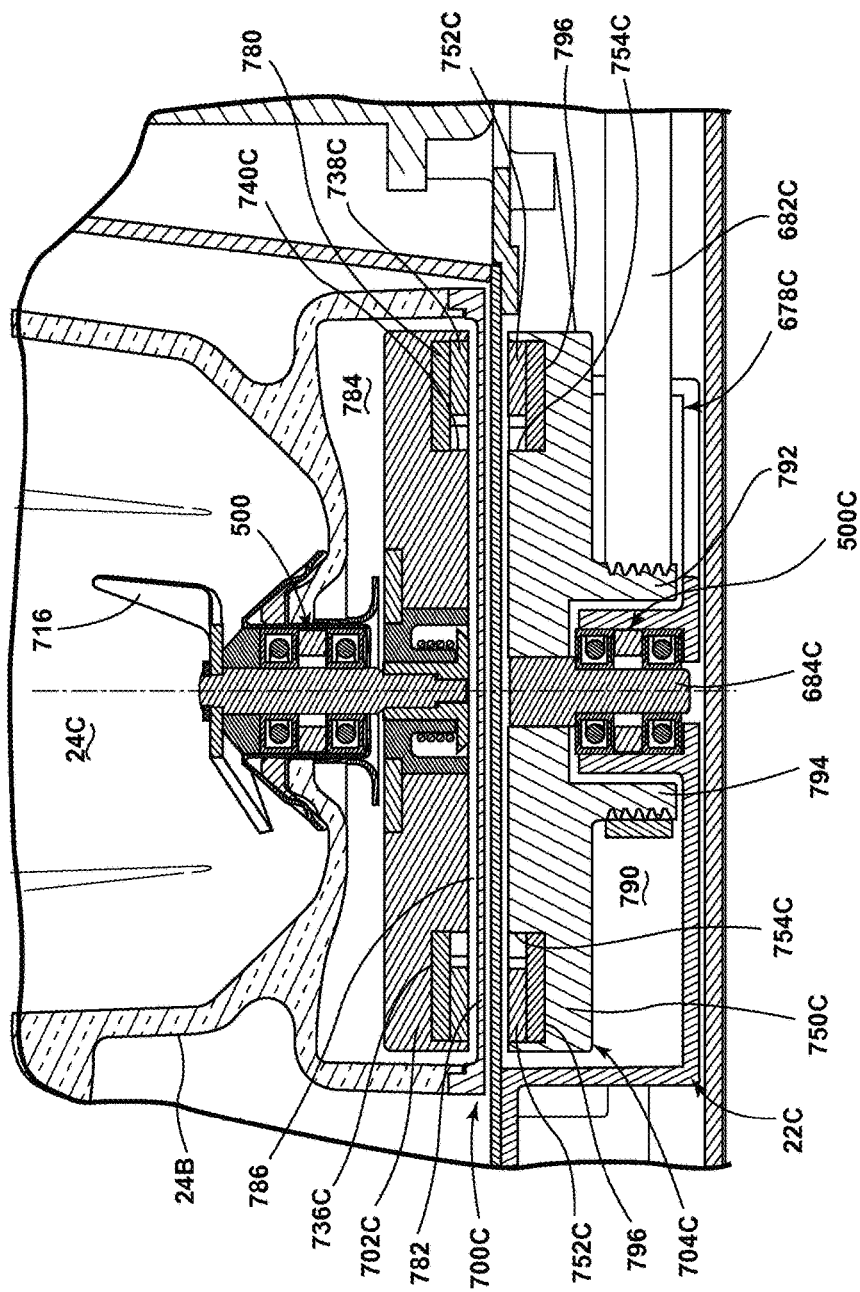
FIG. 23 is a is a cross-sectional view of the blender jar of FIG. 22A as magnetically coupled to a base portion of a blending appliance, having a magnetic coupler disposed therein.

Referring now to FIG. 23, the magnetic coupling system 700C is shown having the lower magnetic coupler 704C disposed within an interior portion 790 of the support base 22C. In this embodiment, the lower magnetic coupling portion 704C is coupled to a belt drive system 678C at a belt receiving portion 792. The belt receiving portion 792 further defines a housing 794 in which a bearing assembly 500C is disposed, much like bearing assembly 500 disposed between the blade assembly 716 and the upper magnetic coupler 702C as described above with reference to FIGS. 12 and 13. The bearing assembly 500C is coupled to shaft 684C, such that lower magnetic coupler 704C is adapted to rotate as driven by the belt drive 678C using belt 682C. Much like upper magnetic coupler 702C, the lower magnetic coupler 704C includes a carrier disc portion 750C having a channel 754C disposed around a periphery thereof. The carrier disc 750C is comprised of a nonmagnetic material similar to carrier 736C noted above. As further shown in FIG. 22A, a backing plate 796 is disposed within the channel 754C and is coupled to a magnetic element 752C. Again, the backing plate 796 is exemplary in nature, and may include any magnetic soft material or magnetizable material, such as mild steel. The backing plate 796 may be a continuous backing plate disposed throughout the channel 754C of the carrier disc 750C. Further, it is contemplated that the magnetic element 752C may be made up of separate and discrete magnetic elements or may be in the form of a continuous magnetic ring disposed within the channel 754C. Thus, the upper and lower magnetic couplers 702C, 704C of the magnetic coupling system 700C each include a backing plate 780, 796, respectively, which act as a short between north and south poles of adjacent magnet assemblies, 738C, 752C, thereby reducing inefficiencies in torque delivery as further described below with reference to FIG. 24.

Figure 24:
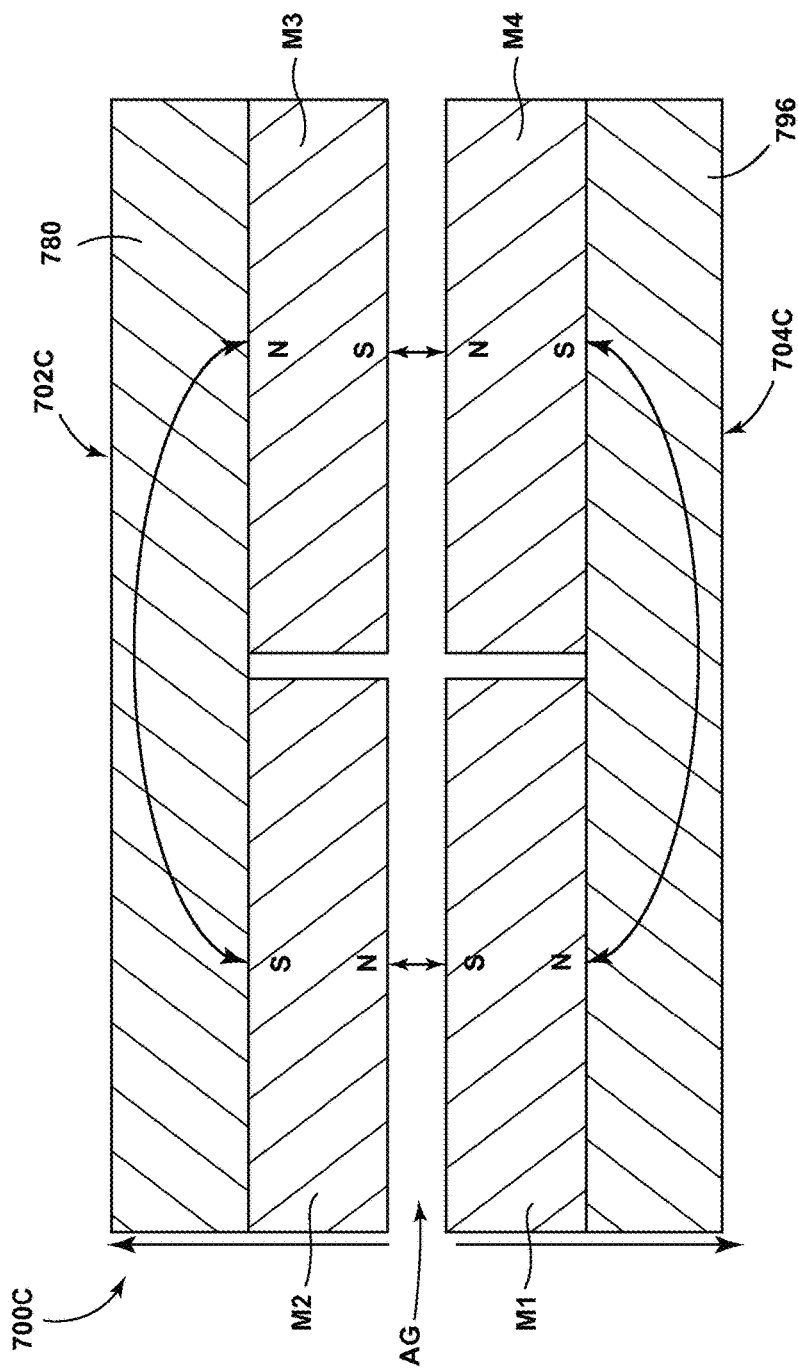
FIG. 24 is a schematic view of a magnetic loop of a magnetic coupling system.

Referring now to FIG. 24, a schematic drawing of the magnetic couplers 702C and 704C is shown with an upper backing plate 780 and a lower backing plate 796. Four magnets M1, M2, M3, and M4 are positioned on the upper and lower backing plates 780, 796 as shown. Thus, magnets M1 and M4 are akin to the magnet elements 752C shown in FIG. 23 for the lower magnetic coupler 704C, while magnets M2, M3 are akin to magnetic elements 738C shown in FIG. 23 for the upper magnetic coupler 702C. In this arrangement, an air gap AG is defined between the upper magnetic coupler 702C and the lower magnetic coupler 704C, which is akin to air gap 782 shown in FIG. 23. The magnets M1 through M4 have alternating north and south poles (N, S) to define a magnetic field loop. When arranged in an arcuate orientation, the magnets M1 through M4, as disposed in the upper and lower magnetic couplers 702C, 704C, create a magnet torque coupler across the air gap AG. The air gap AG provides for a frictionless interface between the upper and lower magnetic couplers 702C and 704C, however, this air gap AG also produces undesired reluctance as further described below. With the air gap AG in place between the upper and lower magnetic couplers 702C, 704C, a misalignment of the magnets M2, M3 with magnets M1, M4 will generate a torque that is easily corrected given the frictionless interface at the air gap AG.

As noted above, the air gap AG provides for reluctance in the magnetic coupling system 700C. This reluctance is similar to resistance in an electric circuit. A magnetic field causes magnetic flux to follow the path of least magnetic reluctance in use. The larger the air gap AG, the higher the reluctance which would interfere with and ultimately reduce the magnetic attraction, indicated by arrows MA, and result in lower magnetic torque capacity for the blending appliance between the upper and lower magnetic couplers 702C, 704C. Having the upper and lower metallic backing plates 780, 796, which are made of a metallic material or soft magnetic material such as mild steel or any other magnetizable material, reduces the reluctance between the north and south poles on the backside of the magnets M1-M4. In this way, the back plates 780, 796 act as a short between north and south poles of adjacent magnets, thereby increasing the magnetic attraction MA disposed across the air gap AG. Any reluctance from the air gap AG is a loss of efficiency, such that the backing plates 780, 796 increase the efficiency, or magnetic attraction MA, and torque capacity of the magnetic coupling system 700C by reducing the reluctance caused by the air gap AG. Thus, the backing plates 780, 796 increase the efficiency of the magnetic coupling system 700C by minimizing any stray magnetic field that may exist in the system, such that magnetic attraction between the magnets M1-M4, is focused or otherwise maximized.

Referring now to FIG. 25A, a brake system 800 is shown for use in conjunction with another embodiment of the upper magnetic coupler 702D. In this embodiment, a blade assembly 716 is coupled to a shaft 710 having a lower portion 712. The lower portion 712 includes stepped coupling portions 802 and 804. In this embodiment, upper magnetic coupler 702D includes a central hub 806 which has a brake surface or brake ring 808 disposed around the central hub 806. The brake surface 808 is disposed on an upper portion 810 of the upper magnetic coupler 702D. The central hub 806 defines an interior cavity 812, in which a biasing mechanism 814 is disposed around an inner column 816 of the central hub 806. The biasing mechanism 814 is shown in the form of a coil spring, and is retained within the cavity portion 812 of the central hub 806 by a retainer plug 820 which includes a press fit portion 822 and a slideable interface portion 824. In use, the retaining plug 820 is adapted to provide an outer sliding interface 826 between the slideable interface portion 824 of the retainer plug 820 and the inner column 816 of the central hub 806. The brake system 800 further comprises an upper brake surface 830 which is disposed on, or adjacent to, the bearing system 500 of the blender jar 24B. In FIG. 25A, the brake surface 808 is considered a lower brake surface which is spaced apart from the upper brake surface 830. Thus, in the disengaged position of FIG. 25A, it is contemplated that the upper magnetic coupler 702D is being pulled downward by a magnetic attraction, indicated by arrow MA, towards a lower magnetic coupling mechanism. Thus, the magnetic attraction MA provides for a force strong enough to overcome the biasing force of the biasing mechanism 814 to allow the upper magnetic coupler 702D to be moved downward such that the upper and lower brake surfaces 830, 808 are not engaged. In this way, the upper magnetic coupled 702D can freely rotate and drive the blade assembly 716 in the disengaged position.

Referring now to FIG. 25B, the brake system 800 is shown in an engaged position, wherein the upper brake surface 830 is in contact with the lower brake surface 808. Thus, the brake mechanism 800 is in an engaged position, wherein the upper magnetic coupler 702D is in a braking position, such that the upper magnetic coupler 702D is no longer free to rotate. As shown in FIG. 25A, the blender jar 24B is disposed on the receiving deck 706, such that the blender jar 24B is likely coupled to a lower magnetic coupling mechanism that is providing the magnetic attraction MA necessary to overcome the biasing force of the biasing mechanism 814 and lower the upper magnetic coupled 702D to the free rotation position. As shown in FIG. 25B, the blender jar 24B has been removed from the receiving deck 706, such that the upper magnetic coupler 702D no longer has the magnetic attraction force pulling the upper magnetic coupler 702D downward towards the disengaged position shown in FIG. 25A. Thus, the upper magnetic coupler 702D is adapted to move vertically in a direction as indicated by arrow 832 between the engaged and disengaged positions. This movement in a vertical direction, as indicated by arrow 832, occurs at the slideable interface 826 inner column 816 of the central hub 806 and the retainer plug 820. The engagement of upper brake surface 830 with lower brake surface 808 stops the rotation of the upper magnetic coupler 702D via friction between the two brake surfaces 830, 808. Thus, when a user removes the blender jar 24B from the blender base, upper magnetic coupler 702D will move upward to the engaged position, and the blade assembly 716 will stop its rotation due to the interaction of the brake surfaces 830, 808 of the brake system 800 as discussed above. The blade assembly 716 can ramp up a significant amount of inertia in use, such that the, without the braking system 800, a user could be exposed to moving blades with in the jar.

Figure 26:
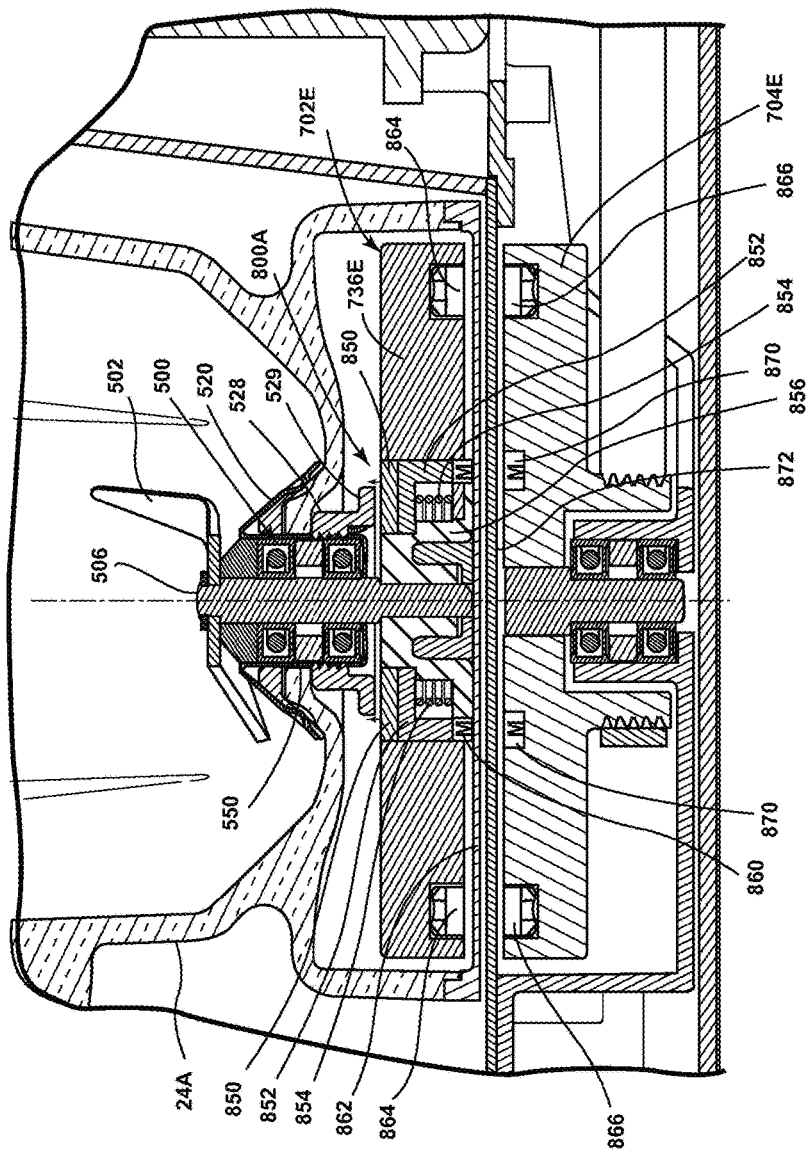
FIG. 26 is a cross-sectional view of a blender jar and blender jar base portion having a magnetic coupler and a braking system of another embodiment in a disengaged position.

Referring now to FIG. 26, another embodiment of a brake system 800A is shown as used with another embodiment of a magnetic coupler assembly 700E. The brake system 800A incorporates bearing assembly 500, which is similar to bearing assembly 500 described and shown above with reference to FIG. 12. Thus, as shown in FIG. 26, the threaded retaining nut 528 is threadingly coupled to the retainer member 520, which thereby couples the bearing assembly 500 to receiving aperture 550 disposed on the blender jar 24A. As noted with reference to FIG. 12, the threaded retaining nut 528 includes a brake surface 529 which is shown in FIG. 26 as being disposed above and adjacent to a lower brake surface 850 disposed on yet another embodiment of the upper magnetic coupler 702E. The lower brake surface 850 is disposed on a ring bracket 852 which is biased by a biasing mechanism 854, shown in FIG. 26 in the form of a coil spring, that is disposed around a central hub 856. The biasing spring 854 biases the ring bracket 852 upward, such that the lower brake surface 850 will rise up to contact the upper brake surface 529 to effectively stop the rotation of the upper magnetic coupler 702E via friction between surfaces 529, 850. The brake system 800A further includes magnetic element 860 which is disposed along a lower surface 862 of the upper magnetic coupler 702E. This magnetic element 860 can be in the form of a ring or otherwise comprised of discrete magnetic elements. The lower magnetic coupler 704E similarly includes magnetic element 870 disposed in a generally central location along the upper surface 872 of lower magnetic coupler 704E directly below magnetic element 860. In assembly, the magnetic elements 860, 870 are magnetically attracted to one another with enough magnetic force to overcome the biasing force produced by the biasing spring 854. In this way, the magnetic attraction between magnetic elements 860, 870 moves the lower brake surfaces 850 away from the upper brake surface 529 disposed on the threaded retaining nut 528 of the bearing system 500. Thus, the brake system 800A, shown in FIG. 26, provides for a moveable brake surface 850 disposed within the upper magnetic coupler 702E, such that the brake surfaces and ring bracket 850, 852 are the only portions of the upper magnetic coupler 702E that are adapted to move. In this way, the body portion 736E of the upper magnetic coupler 702E remains vertically stationary, such that the upper magnetic coupler 702E is less prone to wobble or vibration during rotation. As further shown in FIG. 26, magnetic elements 864 are disposed at an outer periphery of the upper magnetic coupler 702E and are adapted to magnetically coupling with magnetic elements 866 disposed in the lower magnetic coupler 704E.

Figure 27B:
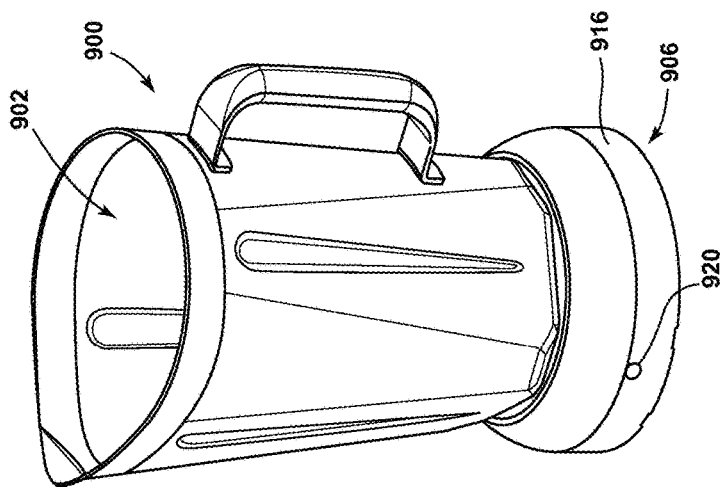
FIG. 27B is a perspective view of the blender jar and lower collar portion of FIG. 23A in an assembled view.
Figure 27A:
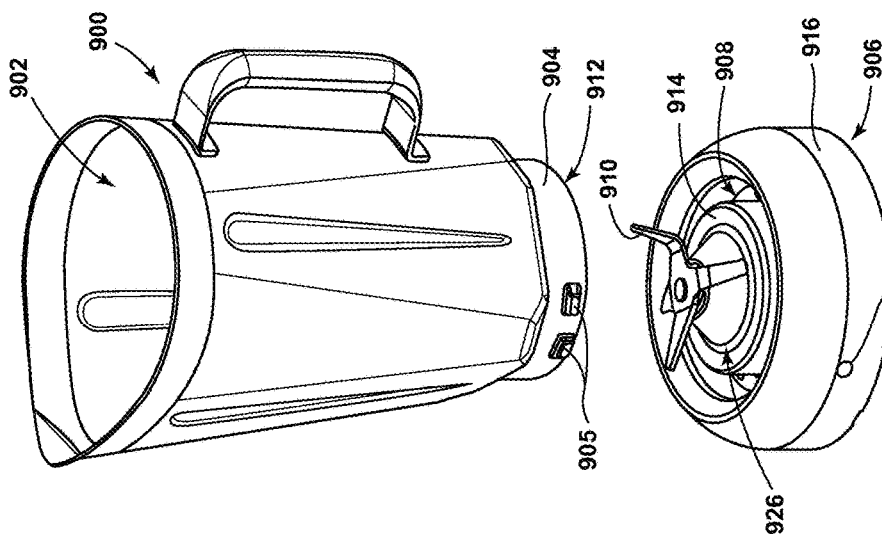
FIG. 27A is a perspective exploded view of another embodiment of a blender jar and lower collar portion having a heating element.

Referring now to FIGS. 27A and 27B, another embodiment of a blender jar 900 is shown. The blender jar 900 includes a receptacle portion 902 and a lower coupling portion 904. The blender jar 900, like the jar assemblies noted above, is adapted to be received in a housing module by laterally movement of the jar 900 into a jar receiving area of the housing. As shown in FIGS. 27A and 27B, the blender jar 900 includes a removable twist-on base collar 906 which couples to the lower coupling portion 904 of the blender jar 900. The lower coupling portion 904 includes engagement features 905 which are adapted to engage reciprocal features disposed in a channel 908 of the base collar 906 in a locking configuration. In this way, the lower coupling portion 904 seals against the channel 908 of the base collar 906, as shown in FIG. 27B. As shown in FIG. 27A, an upwardly extending blade assembly 910 is centrally disposed on the base collar 906, and is adapted to be received in the receptacle portion 902 of the jar 900 through a lower aperture 912 disposed on the jar 900. The blade assembly 910 is mounted on a shell 914 which houses a heating element, as further described below. A lower portion 916 of base collar 906 includes a female power socket 920, which is adapted to receive a male connection pin, or other like power connector, as the jar 900 is laterally received in a blender housing. It is contemplated that the shell 914 and the jar 900 are composed of a highly thermally conductive material such as metal (stainless steel) or glass for use with the heating element as further described below.

Figure 27D:
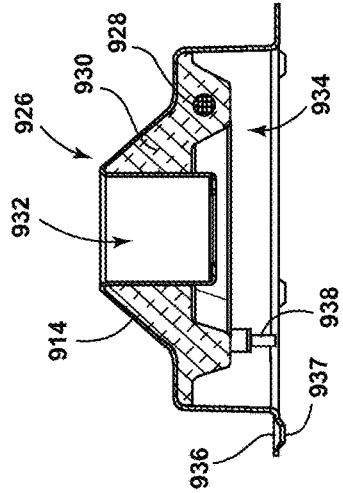
FIG. 27D is a cross-sectional view of the heating element of FIG. 27A.
Figure 27E:
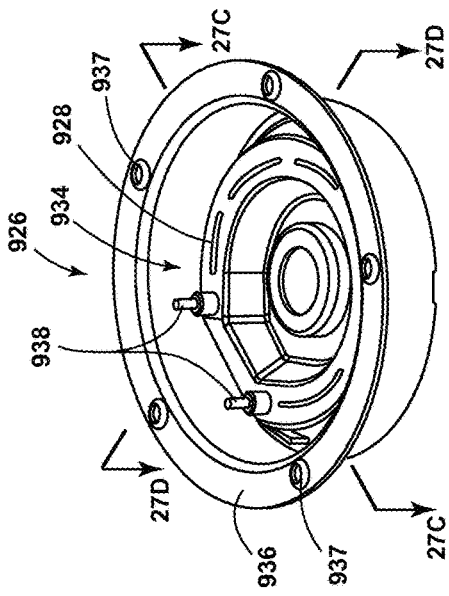
FIG. 27E is a rear perspective view of the heating element of FIG. 27D.
Figure 27C:
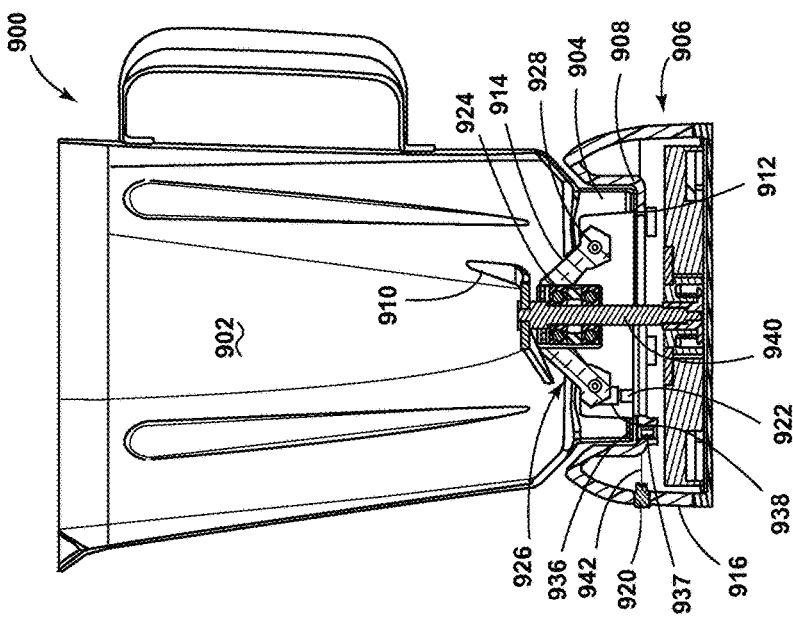
FIG. 27C is a cross-sectional view of the blender jar and lower collar portion of FIG. 23B.

Referring now to FIG. 27C, the blender jar 900 is shown with the blade assembly 910 disposed within the interior cavity or receptacle portion 902. A drive shaft 922 is coupled to a bearing assembly 924 and is adapted to rotatably drive the blade assembly 910 within the receptacle portion 902 of the blender jar 900 during a blending function. As further shown in FIG. 27C, a heater or heating element 926 is coupled to the base collar 906 and disposed about the bearing assembly 924.

As best shown in FIGS. 27D and 27E, the heating element 926 generally includes a calrod heater coil 928 disposed within the shell 914, wherein the coil 928 is surrounded by a heat transferring material 930. The coil 928 is shown in the form of a calrod wire or coil which is adapted to produce heat via an electric current. Other such heating elements can also be used with this embodiment. The heating element 926 further includes a housing 932, wherein the bearing assembly 924 is disposed in assembly. The heating element 926 further includes a cavity portion 934 having a lower flange portion 936 disposed thereabout. The lower flange portion 936 includes a plurality of mounting apertures 937 disposed therealong for mounting the heating element 926 to the base collar 906. Disposed within the cavity 934, male connection pins 938 are disposed for coupling to female connection ports 940 disposed within the collar 906. The female connection ports 940 are further coupled to a lead 942 that is in communication with the power port 920 for powering the calrod coil 928 of the heating element 926. As noted above, it is contemplated that the outer shell 914 of the heating element 926 is comprised of a metallic material, such that heat produced by the calrod heater coil 928 is conductively transferred to the blender jar 900 in use, as the base collar 906 and receptacle portion 902 are in thermal communication with one another. Thus, in use, the heating element 926 allows the user to heat the contents of the interior cavity 902 of the blender jar 900, while also performing a blending function, such as for use when preparing soups and other warm purees. Further, it is contemplated that the heating element 926 may be comprised of a die-cast aluminum member having a non-stick coating, thereby obviating the need for an outer shell 914.

Figure 28A:
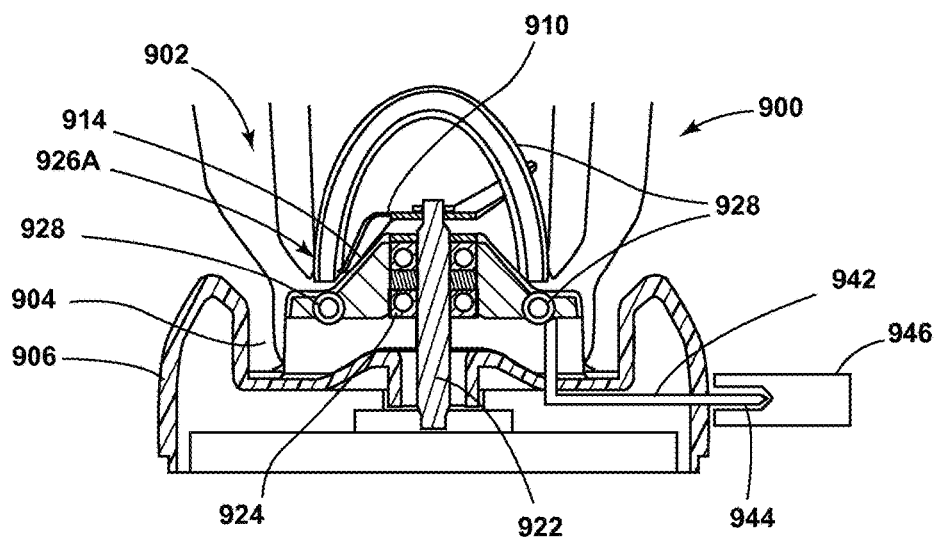
FIG. 28A is a cross-sectional view of another embodiment of a heating element.

Referring now to FIG. 28A, another embodiment of a heating element 926A is shown wherein a calrod heater coil 928 is disposed within the metallic shell 914, such that heating element 926A is suitable to heat the thermally conductive blender jar 900 in use, much like heating element 926 described above. The heating element 926A further includes a portion of the calrod heater coil 928 disposed within the receptacle portion 902 of the blender jar 900. As further shown in the embodiment of FIG. 28A, the heating element 926 includes a power lead 942 that is disposed within the base collar 906, and which further culminates in a male connector pin 944 which extends outwardly from the base collar 906. The male connector pin 944 is adapted to electrically couple with a female connection header or port 946. In assembly, it is contemplated that the female connection header 946 is disposed along the blender housing for coupling with the male connector pin 944 to power the heating element 926A.

Figure 28B:
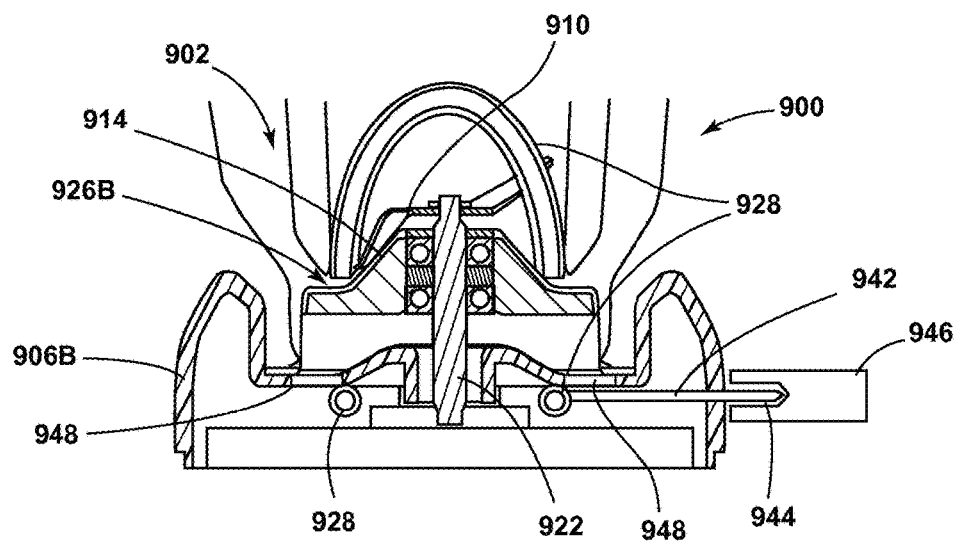
FIG. 28B is a cross-sectional view of yet another embodiment of a heating element.

Referring now to FIG. 28B, another embodiment of a heating element 926B is shown in the form of a calrod heating element 928 disposed within another embodiment of the twist-on base collar 906B. In this embodiment, the base collar 906B includes a metallic ring portion 948 which is disposed adjacent the calrod heating element 928. In this way, the metallic ring portion 948 of the base collar 906B is in thermal communication with the metallic shell 914 of the heating element system 926B. Thus, heat produced by the calrod heating element 928 can radiate through the metallic shell 914 from the base collar 906B, into the thermally conductive blender jar 900. Like heating element 926A described above, heating element 926B also includes a portion of the calrod heater coil 928 disposed within the receptacle portion 902 of the blender jar 900 for directly heating the contents of the blender jar 900.

Figure 29B:
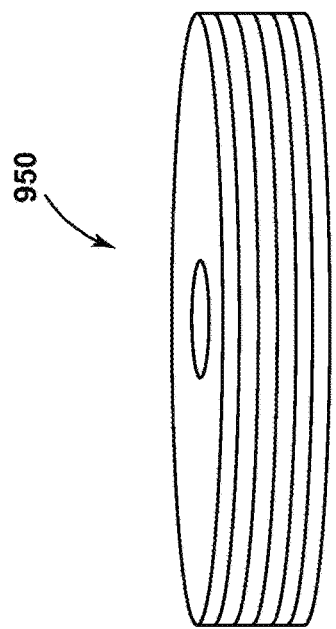
FIG. 29B is a top perspective view of the heating element of FIG. 29A in an assembled view.
Figure 29A:
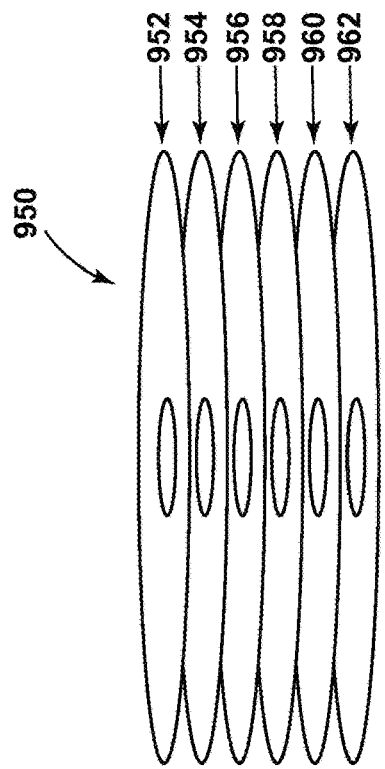
FIG. 29A is a top perspective exploded view of a heating element.
Figure 29C:
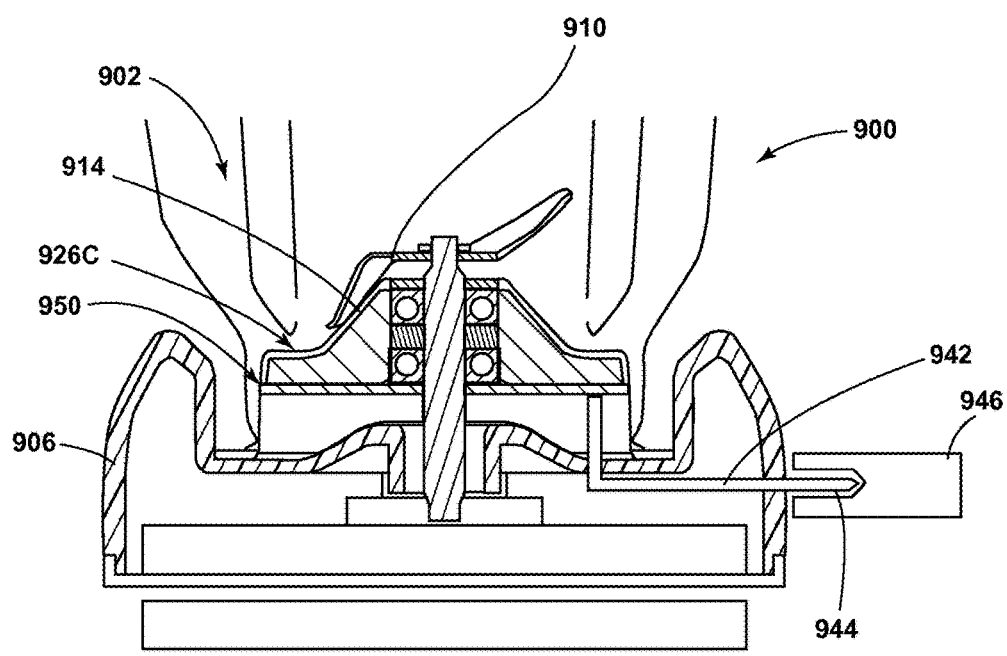
FIG. 29C is a cross-sectional view of yet another embodiment of a heating element.

Referring now to FIG. 29A, an exploded view of a thick film heater plate 950 is shown having a cover coat 952, a film circuit 954, a first bioelectric coating 956, a censor layer 958, a second bioelectric coating 960 and a carrier sheet metal plate 962. As shown in FIG. 29B, the component parts noted above are assembled to form a unitary thick film heater plate 950. The thick film heater plate 950 provides for another embodiment of a heating element 926C as shown in FIG. 29C. As specifically shown in FIG. 29C, the thick film heater plate 950 is disposed below and adjacent to the metallic outer casing or shell 914 of heating element 926C. Thus, heat produced by the thick film heater plate 950 is conductively transferred to the blender jar 900 through the casing or shell 914, which, as noted above, is highly thermally conductive.

Figure 29D:
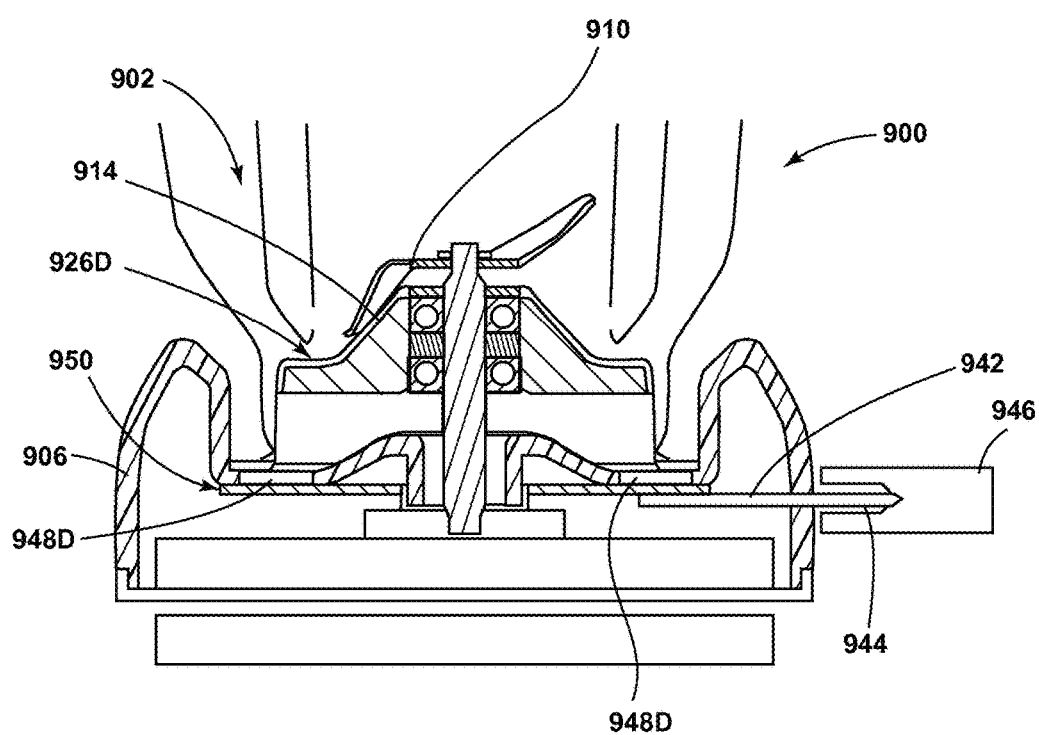
FIG. 29D is a cross-sectional view of yet another embodiment of a heating element.

Referring now to FIG. 29D, the thick film heater plate 950 is disposed within a cavity portion of the base collar 906D, to create another embodiment of a heating element 926D. The base collar 906D includes a metallic ring 948D which is in thermal communication with the metallic shell 914 of the heating element system 926D. Thus, heat produced by the thick film heater plate 950 can radiate through the metallic shell 914 from the base collar 906D, into the thermally conductive blender jar 900 for heating a food substrate disposed in the receptacle 902.

Figure 30:
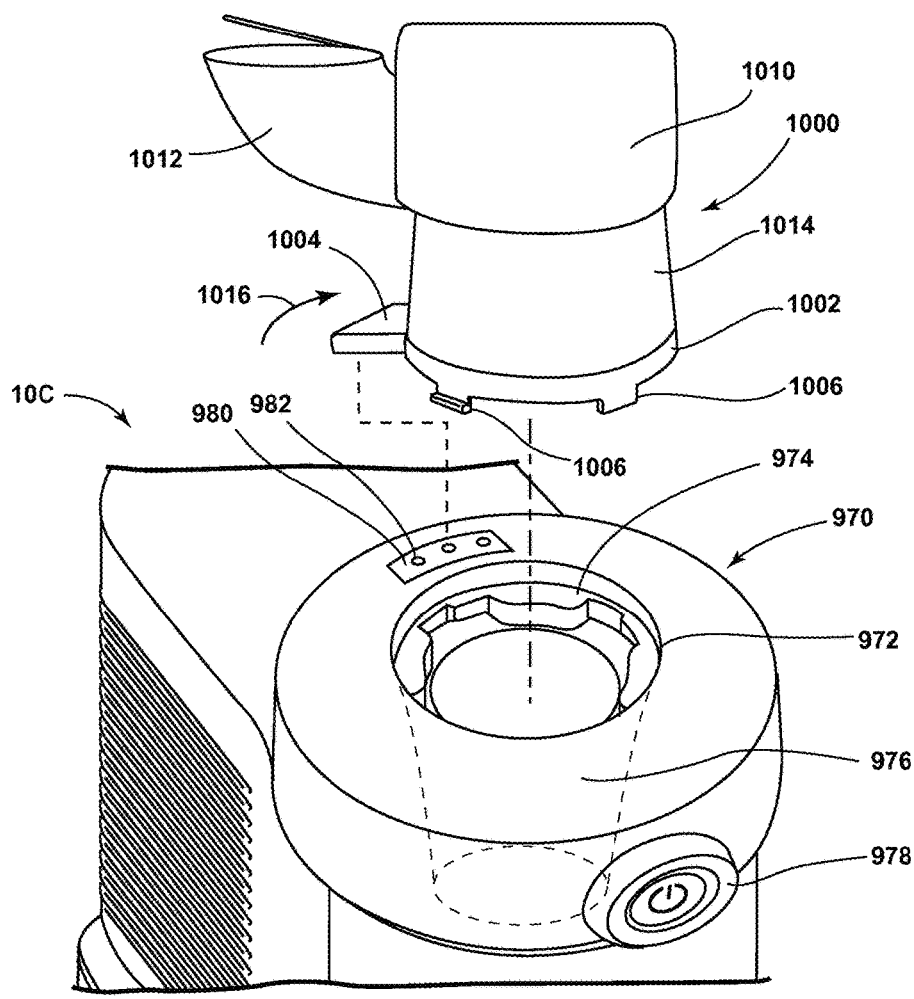
FIG. 30 is a top perspective view of a powered upper housing assembly.

Referring now to FIG. 30, another embodiment of an upper housing assembly 970 is shown for a blending appliance 10C. The upper housing assembly 970 includes an aperture 972 having a locking ring 974 disposed therein. The locking ring 974 is adapted to couple a number of blender accessories as further described below. In assembly, it is contemplated that the aperture 972 opens into a feed chute 976 that is disposed through the upper housing 970 and which further opens into the receptacle portion of a blender jar. The upper housing 970 further includes a forward facing user interface module 978 in the form a rotatable dial, much like dial 442 described above. The upper housing 970 is considered a powered housing, as the upper housing 970 includes a power module 980 having metallized connection pads 982 disposed thereon. The power module 980 is contemplated to be coupled to a lead that connects with the power supply for the blending appliance 10C and the user interface 978. As an exemplary accessory, an ice shaver attachment 1000 is shown exploded away from the upper housing 970. The ice shaver attachment 1000 includes a coupling hub 1002 having a connectivity pad 1004 disposed there on. The coupling hub 1002 is adapted to couple to the locking ring 974 disposed in the aperture 972, via engagement features 1006 disposed on the coupling hub 1002. The engagement features 1006 are twisted into place by turning the ice shaving attachment 1000 in a direction as indicated by arrow 1016. As coupled in place, the engagement features 1006 ensure that the connectivity pad 1004 of the coupling hub 1002 aligns with an electronically couples to the connection pads 982 of the power module 980 to provide power to a motor and blade assembly disposed within a housing 1010 of the ice shaving attachment 1000. Disposed on either side of the housing 1010 is an intake chute 1012 for receiving ice and a feed chute 1014 which is adapted to feed shaved ice to the feed chute 976 of the upper housing 970. In this way, the blending appliance 10C is capable of powering an accessory, like the shaved ice attachment 1000 for easily blending frozen concoctions. The power module 980 is contemplated to be able to power a host of accessories, such as a hot plate or a coffee machine, and non-powered accessories can also be attached to locking ring 974, such as a strainer, a filter, etc.

Figure 31:
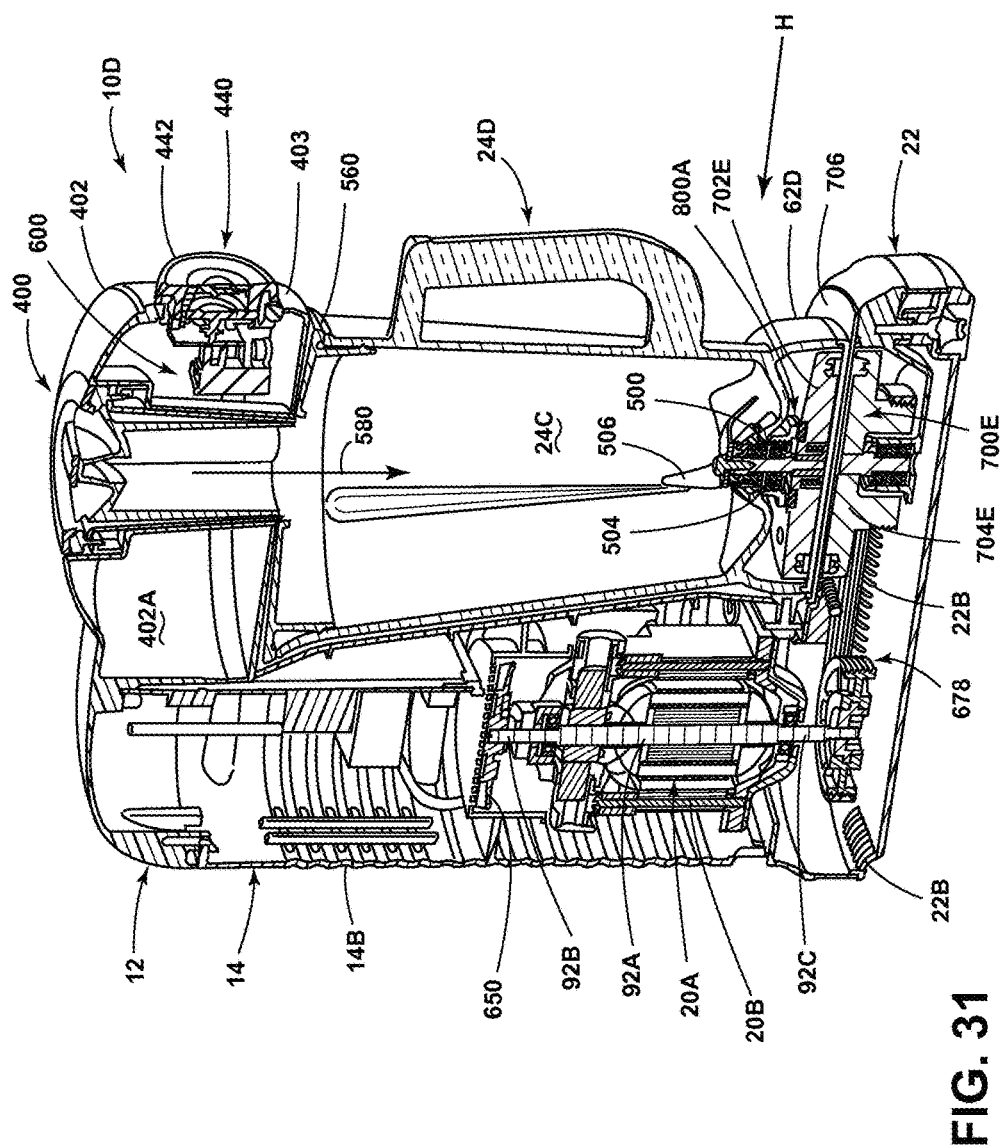
FIG. 31 is a cross-sectional view of yet another embodiment of a blending appliance.

Referring now to FIG. 31, another embodiment of the blending appliance 10D is shown which incorporates several of the features discussed above. Specifically, the blending appliance 10D includes a feed chute assembly 400 disposed within upper housing 402. Disposed within an interior 402A of the upper housing 402, an interlock switch assembly 600 is coupled to a lower portion 403 of the upper housing 402. On a front portion of the upper housing 402, a user interface 440 is shown in the form of a rotating dial 442. A blender jar 24D is laterally received in a jar receiving area 16D in a substantially horizontal manner as indicated by arrow H. In the embodiment shown in FIG. 31, the blender jar 24D is received within the jar receiving area 16D on receiving deck 706. The blender jar 24D further includes a lid 560 which is in abutting engagement with the lower portion 403 of the upper housing 402. The blender jar 24D is shown in open communication with the feed chute assembly 400 through to a receptacle portion 24C of the blender jar 24D. A blade assembly 506 is further disposed within the receptacle portion 24C of the blender jar 24D and is coupled to a drive shaft 504 received within a bearing assembly 500. A magnetic coupling system 700E includes an upper magnetic coupler 702E disposed within a base portion 62D of the blender jar 24D. A lower magnetic coupler 704E is disposed within the support base 22 of the blending appliance 10D. The lower magnetic coupler 704E is operably coupled to a belt drive system 678 which is further coupled to a motor 20D disposed within a motor compartment 14. In use, the motor 20B is adapted to drive the belt drive system 678 to rotate the lower magnetic coupler 704E which in turn rotates the upper magnetic coupler 702E through magnetic forces to power the blade assembly 506 within the receptacle portion 24C of the blender jar 24D. The magnetic coupling system 700E further includes a brake mechanism 800A which is disposed on the upper magnetic coupler 702E and adapted to engage a lower portion of the bearing assembly 500 when the blender jar 24D is laterally removed from the blender housing 12 to stop rotation of the upper magnetic coupler 702E. A fan member 650 is disposed on an upper portion 92B of a motor drive shaft 92A. The motor drive shaft 92A is coupled to and driven by the motor 20B in assembly. It is further contemplated that the fan member 650 may be disposed at a lower end 92C of the motor drive shaft 92A for venting the heat produced by the motor 20A and other board components 20B of the motor 20A. As coupled to the lower portion 92C of the motor drive shaft 92A, the fan member 650 will draw air from the vented portion 14B of the motor compartment 14, to then be exhausted out ventilated portions 22B of the support base 22. In this way, a high pressure area in the motor compartment 14, is separated from a low pressure area of the support base 22.

It is contemplated that for any of the embodiments disclosed herein that the drive system could include a series of gears or belts, as generally described. With regard to all of these embodiments, it is contemplated that various components of certain embodiments may be utilized across different embodiments. For example, the auger assembly generally illustrated in the embodiments of FIGS. 4 and 5 could also be utilized in the first embodiment shown in FIGS. 1-3 to minimizing food bridging. In addition, for each of the embodiments disclosed herein, the blending appliance 10 is designed for unassisted operational blending. More specifically, a user can insert a jar into a jar receiving area, and once the jar is received in the jar receiving area, the jar can be secured in place via the upper locking tab or the base jar lock. The user can then activate the blending appliance 10 and leave the area. Monitored blending of the blending appliance 10 is not required. In addition, because of the construction of the blending appliances disclosed herein, and the lateral insertion of the jar into the jar receiving area, a low profile blending appliance 10 can be maintained that is aesthetically pleasing and does not require substantial vertical space above the blending appliance 10.

It is also important to note that the construction and arrangement of the elements of the concept as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present concept. The exemplary structures and processes disclosed herein are for illustrative purposes and are not to be construed as limiting.

It is also to be understood that variations and modifications can be made on the aforementioned structures and methods without departing from the concepts of the present concept, and further it is to be understood that such concepts are intended to be covered by the following claims unless these claims by their language expressly state otherwise.

What is claimed is:

1. A blending appliance, comprising:
   a housing having a support base with a jar receiving area disposed above the support base;
   a blender jar having a base portion and a receptacle portion;
   an upper magnetic coupler disposed in the base portion of the blender jar;
   a lower magnetic coupler disposed in the support base of the housing, wherein the upper and lower magnetic couplers are coupled to one another by a magnetic coupling when the blender jar is received in the jar receiving area, and further wherein rotation of the lower magnetic coupler rotates the upper magnetic coupler as magnetically coupled thereto; and
   a mechanical brake mechanism configured to stop rotation of the upper magnetic coupler when the blender jar is removed from the jar receiving area by imparting frictional contact on the upper magnetic coupler.

2. The blending appliance of claim 1, including:
   a drive shaft at least partially disposed in the base portion of the blender jar;
   a bearing assembly coupled to the drive shaft within the base portion of the blender jar, the bearing assembly including a brake surface on a lower portion thereof.

3. The blending appliance of claim 2, wherein the upper magnetic coupler is coupled to the drive shaft below the bearing assembly, and further wherein the upper magnetic includes a brake surface on an upper portion thereof.

4. The blending appliance of claim 3, wherein the upper magnetic coupler is vertically moveable along the drive shaft between engaged and disengaged positions.

5. The blending appliance of claim 4, wherein the brake surface of the upper magnetic coupler contacts the brake surface of the bearing assembly when the upper magnetic coupler is in the engaged position.

6. The blending appliance of claim 5, including:
   a biasing mechanism biasing the upper magnetic coupler towards the engaged position.

7. The blending appliance of claim 6, wherein the upper magnetic coupler moves to the engaged position when the blender jar is removed from the jar receiving area.

8. The blending appliance of claim 7, wherein the upper magnetic coupler moves to the disengaged position when the blender jar is received in the jar receiving area, and further wherein the brake surface of the bearing assembly is spaced-apart from the bearing assembly of the upper magnetic coupler when the upper magnetic coupler is in the disengaged position.

9. The blending appliance of claim 8, wherein the upper magnetic coupler is drawn downward towards the disengaged position by the magnetic coupling between the upper and lower magnetic couplers when the blender jar is received in the jar receiving area.

10. A blending appliance, comprising:
- a housing having a jar receiving area positioned above a support base;
- a blender jar having a base portion and a receptacle portion, the blender jar removeably received within the jar receiving area;
- an upper magnetic coupler disposed in the base portion of the blender jar for rotation therein, wherein the upper magnetic coupler includes a brake surface and is operable between first and second positions along a drive shaft;
- a bearing assembly disposed around the drive shaft and having a brake surface, wherein the brake surface of the upper magnetic coupler contacts the brake surface of the bearing assembly when the blender jar is removed from the jar receiving area and the upper magnetic coupler is in the first position; and
- a lower magnetic coupler disposed in the support base of the housing for rotation therein, wherein the upper magnetic coupler is magnetically coupled to the lower magnetic coupler when the blender jar is received in the jar receiving area, and further wherein the upper magnetic coupler is moved to the second position when the upper magnetic coupler is magnetically coupled to the lower magnetic coupler, wherein the brake surface of the upper magnetic coupler is spaced-apart from the brake surface of the bearing assembly when the upper magnetic coupler is in the second position.

11. The blending appliance of claim 10, wherein the bearing assembly includes a biasing mechanism to bias the upper magnetic coupler towards the engaged position.

12. The blending appliance of claim 11, wherein the upper magnetic coupler is moved downward towards the disengaged position when the blender jar is received in the jar receiving area by the magnetic coupling between the upper and lower magnetic couplers.

13. The blending appliance of claim 12, including:
- one or more nonmagnetic layers disposed between the upper and lower magnetic couplers when the blender jar is received in the jar receiving area.

14. The blending appliance of claim 13, wherein the one or more nonmagnetic layers includes one or more of a bottom wall of the base portion of the blender jar, a receiving deck disposed in the jar receiving area, and an air gap.

15. A magnetic coupling system for a blending appliance, comprising:
- an upper magnetic coupler disposed on a drive shaft;
- a lower magnetic coupler spaced-apart from the upper magnetic coupler, wherein the upper magnetic coupler is selectively operable between magnetically coupled and uncoupled positions relative to the lower magnetic coupler, and further wherein the lower magnetic coupler is configured to rotate the upper magnetic coupler using magnetic torque when the upper magnetic coupler is in the magnetically coupled position;
- a bearing assembly disposed on the drive shaft, wherein the upper magnetic coupler contacts the bearing assembly when the upper magnetic coupler is in the uncoupled position; and
- a biasing mechanism operably coupled to the upper magnetic coupler, wherein the biasing mechanism biases the upper magnetic coupler towards the uncoupled position.

16. The magnetic coupling system of claim 15, including:
a first brake surface disposed on the bearing assembly.

17. The magnetic coupling system of claim 16, including:
a second brake surface disposed on the upper magnetic coupler.

18. The magnetic coupling system of claim 17, wherein the second brake surface of the upper magnetic coupler contacts the first brake surface of the bearing assembly when the upper magnetic coupler is in the uncoupled position.

19. The magnetic coupling system of claim 15, wherein the uncoupled position of the upper magnetic coupler is disposed above the magnetically coupled position of the upper magnetic coupler along the drive shaft.

* * * * *